US011527237B1

(12) United States Patent
Sarikaya et al.

(10) Patent No.: US 11,527,237 B1
(45) Date of Patent: Dec. 13, 2022

(54) USER-SYSTEM DIALOG EXPANSION

(71) Applicant: Amazon Technologies, Inc., Seattle, WA (US)

(72) Inventors: Ruhi Sarikaya, Redmond, WA (US); Hung Tuan Pham, Kirkland, WA (US); Savas Parastatidis, Kirkland, WA (US); Dean Curtis, Seattle, WA (US); Pushpendre Rastogi, Seattle, WA (US); Nitin Ashok Jain, Seattle, WA (US); John Arland Nave, Bellevue, WA (US); Abhinav Sethy, Seattle, WA (US); Arpit Gupta, Seattle, WA (US); Mayank Kumar, Sammamish, WA (US); Nakul Dahiwade, Seattle, WA (US); Arshdeep Singh, Seattle, WA (US); Nikhil Reddy Kortha, Seattle, WA (US); Rohit Prasad, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 17/024,959

(22) Filed: Sep. 18, 2020

(51) Int. Cl.
*G10L 13/00* (2006.01)
*G10L 15/16* (2006.01)
*G06F 16/9032* (2019.01)
*G10L 13/08* (2013.01)

(52) U.S. Cl.
CPC ........ *G10L 15/16* (2013.01); *G06F 16/90332* (2019.01); *G10L 13/08* (2013.01)

(58) Field of Classification Search
None
See application file for complete search history.

(56) References Cited

U.S. PATENT DOCUMENTS

| | | | | |
|---|---|---|---|---|
| 6,044,347 A | * | 3/2000 | Abella | G10L 15/22 704/E15.04 |
| 6,223,150 B1 | * | 4/2001 | Duan | G10L 15/26 704/277 |
| 6,356,865 B1 | * | 3/2002 | Franz | G10L 15/26 704/277 |
| 6,374,224 B1 | * | 4/2002 | Horiguchi | G10L 15/26 704/277 |
| 8,577,671 B1 | * | 11/2013 | Barve | G06F 16/24573 715/752 |
| 8,700,404 B1 | * | 4/2014 | Chotimongkol | G10L 15/18 704/255 |

(Continued)

*Primary Examiner* — Jakieda R Jackson
(74) *Attorney, Agent, or Firm* — Pierce Atwood LLP

(57) ABSTRACT

Techniques for recommending a skill experience to a user after a user-system dialog session has ended are described. Upon a dialog session ending, the system uses a first machine learning model to determine potential intents to recommend to a user. The system then uses a second machine learning model to determine a particular skill and intent to recommend. The system then prompts the user to accept the recommended skill and intent. If the user accepts, the system calls the recommended skill to execute. As part of calling the skill, the system sends to the skill at least one entity provided in a natural language user input of the ended dialog session. This enables the skill to skip welcome prompts, and initiate processing to output a response based on the intent and the at least one entity of the ended dialog session.

20 Claims, 15 Drawing Sheets

(56) References Cited

U.S. PATENT DOCUMENTS

| | | | | |
|---|---|---|---|---|
| 8,762,156 | B2* | 6/2014 | Chen | G10L 15/183 |
| | | | | 704/265 |
| 10,276,170 | B2* | 4/2019 | Gruber | G10L 15/22 |
| 10,417,037 | B2* | 9/2019 | Gruber | H04W 4/023 |
| 2003/0028883 | A1* | 2/2003 | Billmaier | H04N 21/441 |
| | | | | 725/6 |
| 2004/0117189 | A1* | 6/2004 | Bennett | G09B 5/04 |
| | | | | 704/E15.04 |
| 2006/0080101 | A1* | 4/2006 | Chotimongkol | G06F 40/30 |
| | | | | 704/E15.026 |
| 2013/0275899 | A1* | 10/2013 | Schubert | B60K 35/00 |
| | | | | 715/765 |
| 2014/0081633 | A1* | 3/2014 | Badaskar | G06F 16/43 |
| | | | | 707/723 |
| 2014/0244686 | A1* | 8/2014 | Tran | G06F 3/0482 |
| | | | | 707/775 |
| 2015/0006169 | A1* | 1/2015 | Biadsy | G10L 15/22 |
| | | | | 704/235 |
| 2015/0058358 | A1* | 2/2015 | Xu | G06F 16/972 |
| | | | | 707/748 |

* cited by examiner

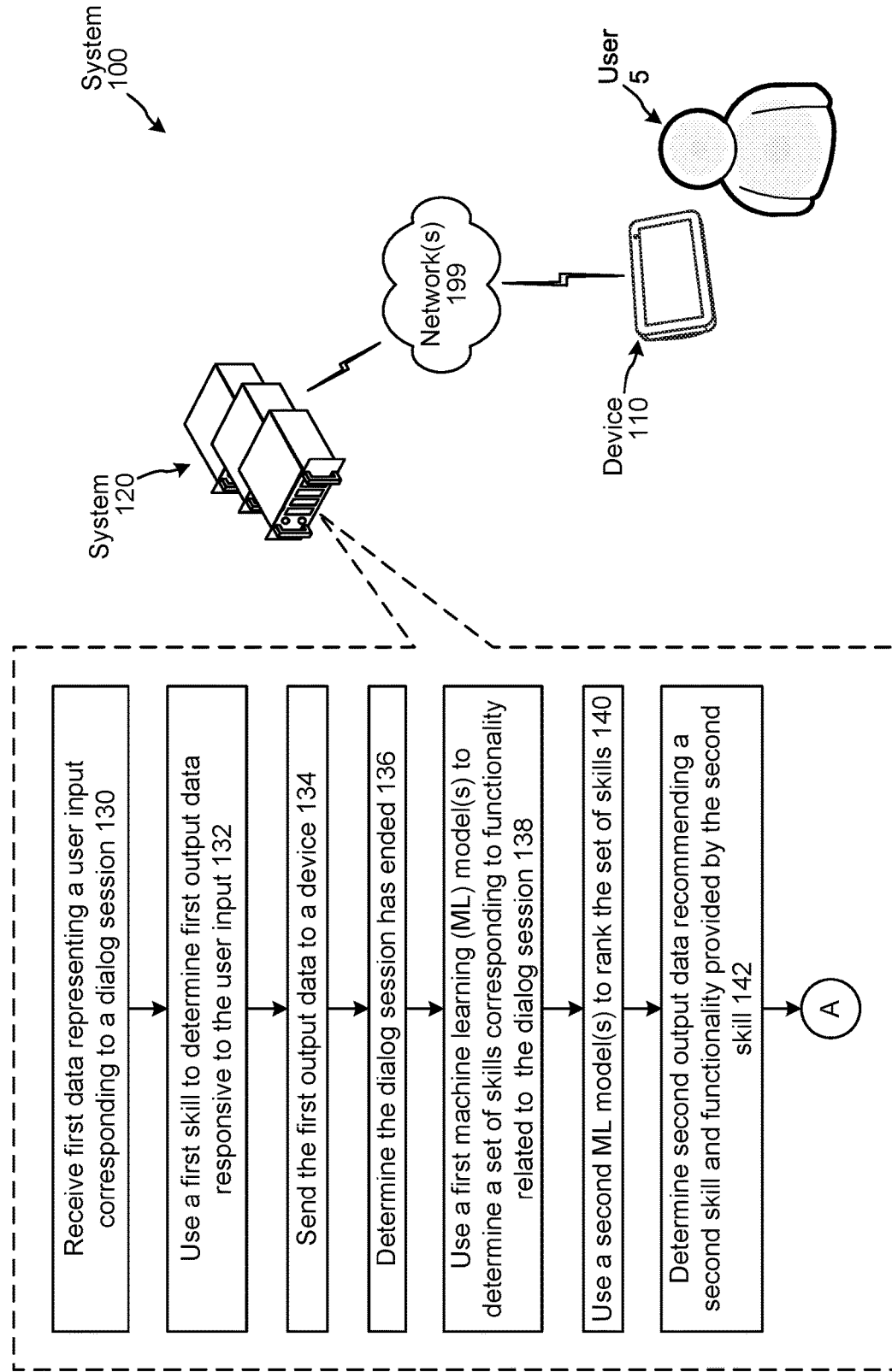

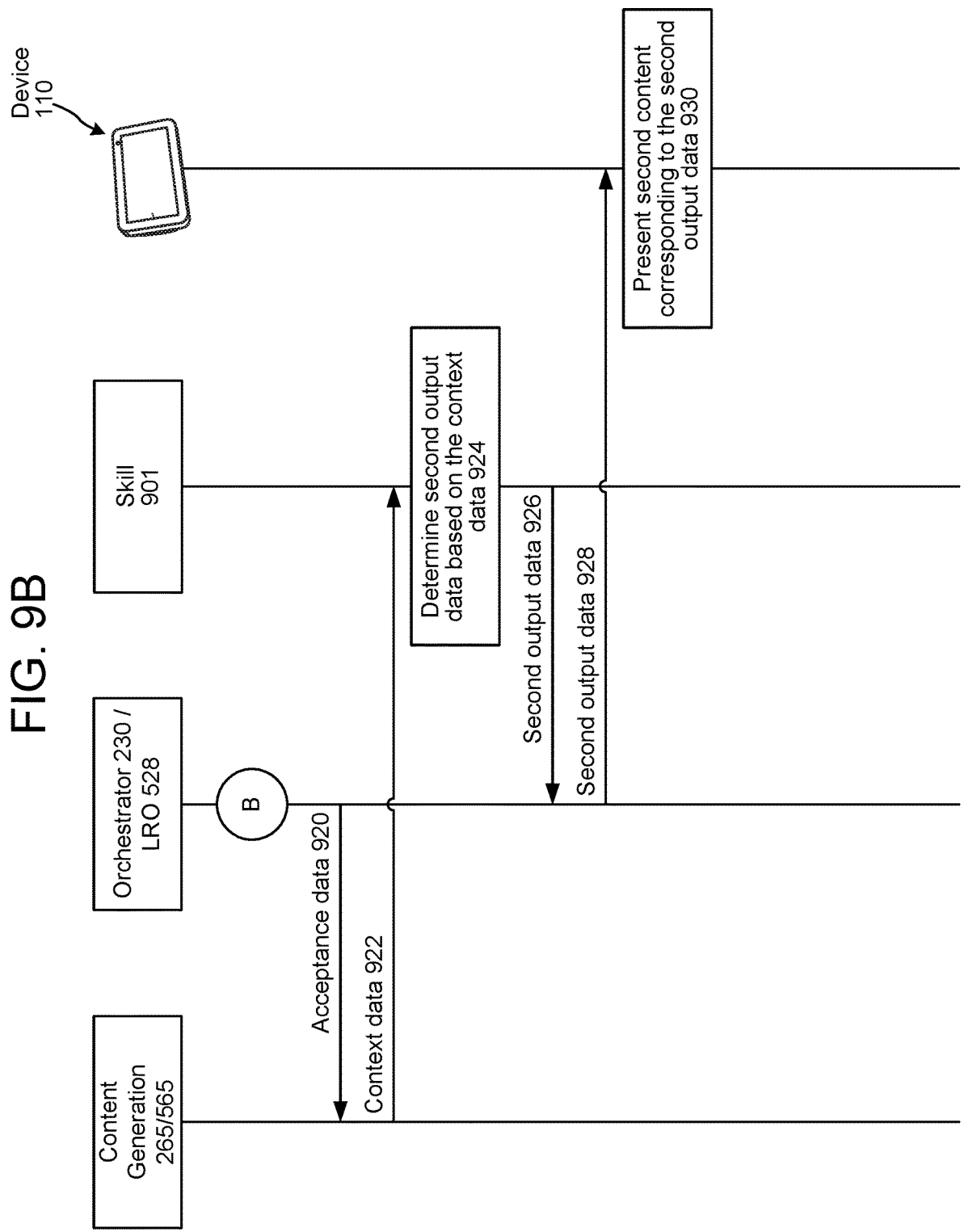

USER-SYSTEM DIALOG EXPANSION

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are conceptual diagrams illustrating a system configured to recommend skill functionality to a user, according to embodiments of the present disclosure.

FIGS. 9A-9B are signal flow diagram illustrating processing that may be performed in response to the skill proposal component outputting prompt text data, according to embodiments of the present disclosure.

DETAILED DESCRIPTION

Figure 1B:
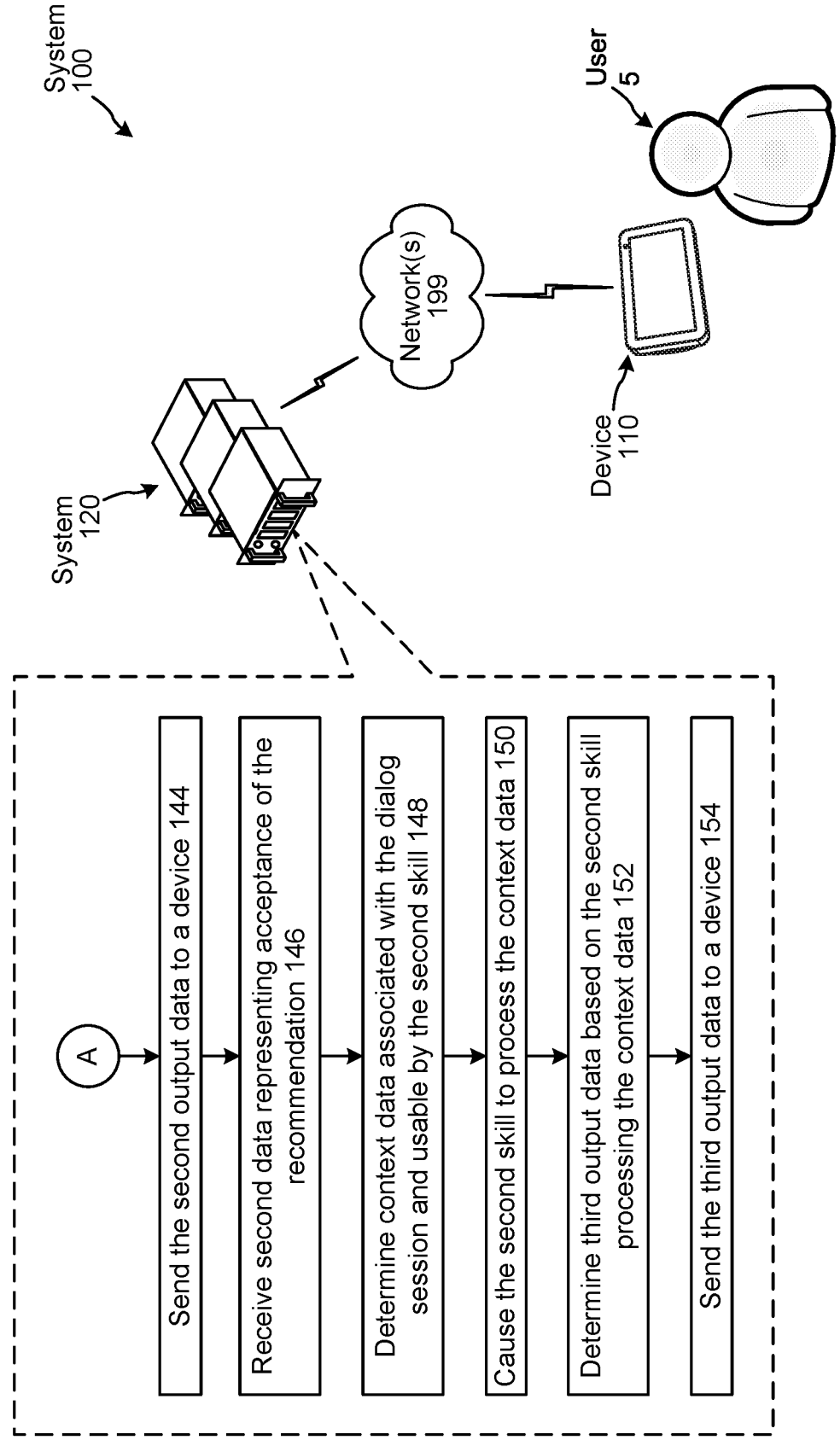

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

A user may engage in a dialog session with a system. As used herein, a "dialog session" may refer to data transmissions (such as relating to multiple natural language user inputs and corresponding system outputs) between the system and a device(s) that all relate to a single originating natural language user input. The data transmissions of a dialog session may be associated with a same dialog session identifier. A dialog session identifier may be used by components of the system to track information across the dialog session. For example, a device may send, to the system, data corresponding to "Alexa, play [trivia game name]." The system may send, to the device, data corresponding to a trivia game question to be output to a user. The user may then respond to the question, and the device may send, to the system, data corresponding to the response. Such sending of data from the device to the system and sending of data from the system to the device may all be part of the same dialog session and thus correspond to a single dialog session identifier. In some examples, a dialog session-initiating natural language user input may include a wakeword (such as "Alexa") or a wake phrase. Subsequent natural language user inputs of the same dialog session may or may not include the wakeword or the wake phrase. Each natural language user input of a dialog session may be associated with a unique natural language user input identifier such that multiple natural language user input identifiers may be associated with a single dialog session identifier. A natural language user input and corresponding system output may be collectively referred to as a "turn" of a dialog session. Thus, it will be appreciated that a dialog session may include more than one turn.

A dialog session may correspond to a series of natural language user inputs and system outputs in which a time period, between any given system output and a next-received natural language user input, is not more than a threshold time period (e.g., 30 seconds). In at least some embodiments, a dialog session may correspond to natural language user inputs received by a same device (regardless of the user(s) that provided the natural language user inputs). In at least some embodiments, a dialog session may correspond to natural language user inputs that are received by more than one device, but which are all provided by the same user.

A dialog session may end when a time period, between any given system output and a next-received natural language user input of a dialog session, equals or exceeds a threshold time period (e.g., 30 seconds), and/or when the user gives an indication to the system of the dialog ending (e.g., the user says "thank you," "I'm done," "end session," etc., starts talking to another person, etc.). As another example, a dialog session may end when two consecutive natural language user inputs are unrelated (e.g., correspond to unrelated intents). For example, a user may provide a first natural language user input corresponding to a <OutputWeather> intent, a second natural language user input corresponding to a <OutputEvent> intent, and a third natural language user input corresponding to a <ReadBook> intent. The first natural language user input and the second natural language user input may correspond to a first dialog session as the first natural language user input and the second natural language user input correspond to related intent (i.e., the outputting of weather and event information). However, the third natural language user input may correspond to a second dialog session because the intent of the third natural language user input is unrelated to the intents of the first natural language user input and the second natural language user input. In other words, the first natural language user input and the second natural language user input may correspond to a first dialog session because the first natural language user input and the second natural language user input correspond to related topics; but the third natural language user input may correspond to a second dialog session because the topic of the third natural language user input (i.e., reading a book) is unrelated to the topics of the first natural language user input and the second natural language user input.

A dialog session may be a single-skill session, meaning the dialog session may include natural language user inputs all directed to, and system outputs all provided by, a single skill. Alternatively, a dialog session may be a multi-skill dialog session, meaning natural language user inputs and system outputs of the dialog session may be directed to and provided by different skills. For example, a natural language user input and system output of a first turn of a dialog session may be directed to and provided by a first skill, a natural language user input and system output of a second turn of a dialog session may be directed to and provided by a second skill, etc. A skill may process with respect to more than one (consecutive or non-consecutive) turn of a single dialog session. As used herein, a "skill session" may refer to one or more consecutive turns of a dialog session that are processed by a single skill.

The present disclosure provides, among other things, techniques for providing, to a user, information (e.g., skill functionality) that may be of interest to the user and that is related to a dialog session that has ended. Once a dialog session has concluded (e.g., once a system output has been output in response to a natural language user input of a dialog session), data (representing the dialog session has ended) may be sent to a skill proposal component of the system. The skill proposal component is configured to determine whether a skill (which may or may not have executed during the previous dialog session) provides functionality related to the concluded dialog session between the user and the system. The skill proposal component may implement a first machine learning (ML) model(s) (and optionally one or more rules) to determine a set of skills that provide functionality related to the concluded user-system dialog session. For example, if a turn in the dialog session corresponded to a natural language user input inquiring about ticket information for an event in Seattle, Wash., the first ML model(s) may determine a set of skills that may include ticketing weather skill configured to output weather information for Seattle.

The skill proposal component may implement a second ML model(s) to rank the set of skills based on, for example, the previous dialog session, a present time, one or more user attributes, and various past multi-skill dialog sessions of various users of the system. Following the ranking, the skill proposal component may determine a prompt (e.g., synthesized speech and/or text) recommending the top-ranked skill and functionality performable by the top-ranked skill. Using the foregoing example, the top-ranked skill may be the event ticketing skill and the functionality may be outputting information regarding upcoming events.

In response to the user accepting the skill proposal component's recommendation, the system may send, to the recommended skill, data representing an intent (corresponding to the recommended functionality) and context information corresponding to turns of the previous dialog session. In the foregoing example where a turn in the dialog session corresponded to a natural language user input inquiring about the weather in Seattle, Wash., the data sent to the recommended skill may include an entity type of "location" and an entity value of "Seattle, Wash."

A skill may be configured such that, typically, the skill engages a user through a series of welcome prompts in order to gather information so the skill can perform an action. However, by the system sending the foregoing intent and context information to the recommended skill, the recommended skill is able to skip the welcome prompts, and start processing to perform an action based on the intent and context information received. In other words, the skill may engage the user in the user experience pipeline where it is relevant to the user. In the foregoing example, the event ticketing skill may interact with the user by outputting information for upcoming events in Seattle, Wash. (without first querying the user for location and time information, as part of its welcome prompts).

Teachings of the present disclosure provide an improved user experience by anticipating the needs of a user and reducing the cognitive burden of the user needing to achieve their tasks/goals (e.g., needing to affirmatively invoke further skill functionality) and/or anticipate latent, helpful, inherent or other type of (potentially) related tasks/goals. Teachings of the present disclosure also provide an improved user experience by recommending skill functionality to a user that the user may not be aware of. By enabling a skill to skip the welcome prompts section of its user experience pipeline, the present disclosure also provides an improved user experience by allowing a user to accomplish a skill interaction in a fewer number of turns.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A-1B illustrate a system 100 configured to recommend skill functionality to a user. Although the figures and discussion of the present disclosure illustrate certain steps in a particular order, the steps described may be performed in a different order (as well as certain steps removed or added) without departing from the present disclosure. As shown in FIGS. 1A-1*i*, the system 100 may include a device 110 (local to a user 5) in communication with a system 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system 120 receives (130) first data representing a user input corresponding to a dialog session. For example, the device 110 may receive audio corresponding to a spoken natural language user input from the user 5. The device 110 may determine audio data representing the audio, and may send the audio data (an example of the first data) to the system 120. For further example, the device 110 may receive a text-based (e.g., typed) natural language user input from the user 5. The device 110 may determine text data representing the text-based natural language user input, and may send the text data (an example of the first data) to the system 120. In another example, the device 110 may include (or otherwise be associated with) a camera that captures a sequence of images representing the user 5 performing a gesture (an example of a user input). The device 110 may send image data (representing the sequence of images) and/or an indication of the gesture performed (collectively an example of the first data) to the system 120. In a further example, the device 110 may include (or otherwise be associated with) a motion sensor configured to detect motion. When the device 110 detects motion (an example of a user input), the device 110 may send first data, representing the detected motion, to the system 120. In another example, the device 110 may include a button or display a virtual button, and the device 110 may detect the user 5 interacting with the button (an example of a user input). The user 5 may interact with the button in various manners, such as a single quick press, a single long press, a double tap, a roaming touch input in a particular direction, etc. The device 110 may send first data, representing the detected button interaction, to the system 120.

The system 120 uses (132) a first skill to determine first output data responsive to the user input. For example, if the first data is audio data representing a spoken natural language user input, the system 120 may perform ASR processing and NLU processing (or SLU processing) on the audio data to determine NLU output data representing the spoken natural language user input, and the first skill may process the NLU output data to determine the first output data. For further example, if the first data is text data representing a text-based natural language user input, the system 120 may perform NLU processing on the text data to determine NLU output data representing the text-based natural language user input, and the first skill may process the NLU output data to determine the first output data. In another example, if the first data is image data representing a sequence of images, the system 120 may process the image data to determine a gesture (performed by the user 5), determine the gesture corresponds to stored NLU output data (or determine the gesture corresponds to other stored data that NLU processing is performed on to determine the NLU output data at runtime), and the first skill may process the NLU output data to determine the first output data. In a further example, if the first data is an indication of the gesture, the system 120 may determine the indication corresponds to stored NLU output data (or determine the gesture corresponds to other stored data that NLU processing is performed on to determine the NLU output data at runtime), and the first skill may process the NLU output data to determine the first output data. For further example, if the first data is motion sensor data received from a particular motion sensor, the system 120 may determine the motion sensor is associated with stored NLU output data (or associated with other stored data that NLU processing is performed on to determine the NLU output data at runtime), and the first skill may process the NLU output data to determine the first output data. In another example, if the first data indicates a button interaction, the system 120 may determine the button interaction corresponds to stored NLU output data (or determine the button interaction corresponds to other stored data that NLU processing is performed on to determine the NLU output data at runtime), and the first skill may process the NLU output data to determine the first output data.

The system 120 sends (134) the first output data to a device 110. In response to receiving the first output data, the device 110 may present the first output data to the user 5. For example, the first output data may be first output audio data including TTS-generated synthesized speech. In this example, the device 110 may present the first output audio data as audio to the user 5. In another example, the first output data may be first output text data, and the device 110 may present the first output text data as displayed text to the user 5. In another example, the first output data may include first output audio data and first output text data. In this example, the device 110 may present the first output audio data as audio to the user 5, and may present the first output text data as displayed text to the user 5. In at least some embodiments, the device 110 that presents the first output data may be the same device 110 that received the user input corresponding to the first data of step 130. In at least some other embodiments, the device 110 that presents the first output data may be different than the device 110 that received the user input. When two different devices present the first output data and receive the user input, the two different devices may nonetheless be associated with the same profile identifier (e.g., user profile identifier, group profile identifier, etc.).

At some point, the system 120 may determine (136) the dialog session, corresponding to the first data and the first output data, has ended. For example, the system 120 may determine a period of time has elapsed since the device presented the first output data, the system 120 has not received another user input from the user 5/device 110 during the period of time, and that the period of time satisfies a condition (e.g., is greater than or equal to a threshold period of time). For further example, the system 120 may determine the end of the dialog session based on a spoken natural language user input explicitly ending the dialog session (e.g. a user saying "thank you," "I'm done," "end session," or the like), the user 5 selecting a button to end the dialog session, presence detection processing (using a Bluetooth beacon at the device 110, a motion sensor, image data and computer vision, etc.) indicating the user 5 is no longer detected (e.g., due to the user 5 walking away from the device 110), the user 5 starting to talk to another person, etc. In general, the ending of a dialog session may represent the user 5 is done interacting with the system 120.

After determining the dialog session has ended, the system 120 may use (138) a first machine learning (ML) model(s) to determine a set of skills corresponding to functionality related to the dialog session (e.g., based on an inferred, latent goal of the user 5). For example, if a turn in the dialog session corresponded to a user input inquiring about the weather in Seattle, Wash., the first ML model(s) may determine a set of skills including an event ticketing skill configured to output information regarding upcoming events in Seattle.

The system 120 may thereafter use (140) a second ML model(s) to rank the set of skills. In other words, the second ML model(s) may be configured to determine a skill that provides functionality most likely of interest to the user 5.

Following the ranking, the system 120 may determine (142) second output data (e.g., a prompt) recommending a second skill (e.g., a top-ranked skill in the ranked skills) and functionality provided by the second skill. The second output data may include second output audio data (e.g., TTS-generated synthesized speech) and/or second output text data. The second output data may include an invocation name of the second skill and describe the functionality of the second skill.

The system 120 sends (144) the second output data to a device 110. In response to receiving the second output data, the device 110 may present the second output data to the user 5. For example, the second output data may be second output audio data including TTS-generated synthesized speech. In this example, the device 110 may present the second output audio data as audio to the user 5. In another example, the second output data may be second output text data, and the device 110 may present the second output text data as displayed text to the user 5. In another example, the second output data may include second output audio data and second output text data. In this example, the device 110 may present the second output audio data as audio to the user 5, and may present the second output text data as displayed text to the user 5. In at least some embodiments, the device 110 that presents the second output data may be the same device 110 that received the user input (corresponding to the first data of step 130) and presented the first output data at step 134. In at least some other embodiments, the device 110 that presents the second output data may be different than the device(s) 110 that received the user input and/or presented the first output data. When different devices receive the user input, present the first output data, and/or present the second output data, the different devices may nonetheless be associated with the same profile identifier (e.g., user profile identifier, group profile identifier, etc.).

The system 120 may thereafter receive (146) second data representing acceptance of the recommendation (i.e., of the second skill processing to perform the functionality). For example, if the second data is audio data representing a spoken natural language user input, the system 120 may perform ASR processing and NLU processing (or SLU processing) on the audio data to determine NLU output data representing the spoken natural language user input accepts the recommendation. For further example, if the second data is text data representing a text-based natural language user input, the system 120 may perform NLU processing on the text data to determine NLU output data representing the text-based natural language user input accepts the recommendation. In another example, if the second data is image data representing a sequence of images, the system 120 may process the image data to determine a gesture (performed by the user 5), and may determine the gesture (e.g., the nodding of a head of the user 5) corresponds to acceptance of the recommendation. In a further example, if the second data is an indication of the gesture, the system 120 may determine the indicated gesture corresponds to acceptance of the recommendation. For further example, if the second data indicates a button interaction, the system 120 may determine the button interaction corresponds to acceptance of the recommendation.

Before or after receiving the second data, the system 120 may determine (148) context data associated with the dialog session. The context data may correspond to one or more turns of the dialog session. The context data may represent an intent corresponding to the recommended functionality of the second skill. The context data may additionally or alternatively represent an entity type and/or entity value corresponding to a turn of the dialog session. For example, if a turn in the dialog session corresponded to a user input inquiring about the weather in Seattle, Wash., the context data may include an entity type of "location" and an entity value of "Seattle, Wash."

The system 120 causes (150) the second skill to process the context data. By including an entity type(s) and/or entity value(s) (from the turn(s) of the dialog session) in the context data, the second skill may begin processing at a step in the second skill's processing pipeline after a welcome prompt section of the second skill's processing pipeline. In the foregoing example where the second skill is an event booking skill, the event booking skill may be configured to commence processing by outputting prompts to the user 5 to obtain information such as location and time information, so the second skill can thereafter determine one or more events corresponding to the location and time information. However, by including the entity type "location" and the entity value "Seattle, Wash." in the context data sent to the second skill, the second skill may commence processing by simply determining one or more events corresponding to the entity type and entity value, without first querying the user for location and time information. For example, the second skill may determine an intent and the entity value in the context data, and based thereon determine skill output data without querying the user for natural language user input corresponding to an entity value.

The system 120 determines (152) third output data based on the second skill processing the context data. The second skill may determine skill output data representing a result of processing of the context data. For example, if the second skill is an event booking skill and the context data included the entity type "location" and the entity value "Seattle, Wash.," the skill output data may correspond to names of events in Seattle, Wash. (and optionally time information for the events). In at least some embodiments, the system 120 may perform TTS processing on the skill output data to determine third output data corresponding to synthesized speech. In at least some embodiments, the system 120 may perform natural language generation processing on the skill output data to determine third output data representing a natural language output corresponding to the skill output data. In at least some embodiments, the system 120 may determine the third output data to include synthesized speech and natural language text data.

The system 120 sends (154) the third output data to a device 110. In response to receiving the third output data, the device 110 may present the third output data to the user 5. For example, the third output data may be third output audio data including TTS-generated synthesized speech. In this example, the device 110 may present the third output audio data as audio to the user 5. In another example, the third output data may be third output text data, and the device 110 may present the third output text data as displayed text to the user 5. In another example, the third output data may include third output audio data and third output text data. In this example, the device 110 may present the third output audio data as audio to the user 5, and may present the third output text data as displayed text to the user 5. In at least some embodiments, the device 110 that presents the third output data may be the same device 110 that received the user input (corresponding to the first data of step 130), presented the first output data at step 134, and presented the second output data at step 144. In at least some other embodiments, the device 110 that presents the third output data may be different than the device(s) 110 that received the user input, presented the first output data, and/or presented the second output data. When different devices receive the user input, present the first output data, present the second output data, and/or present the third output data, the different devices may nonetheless be associated with the same profile identifier (e.g., user profile identifier, group profile identifier, etc.).

Figure 2:
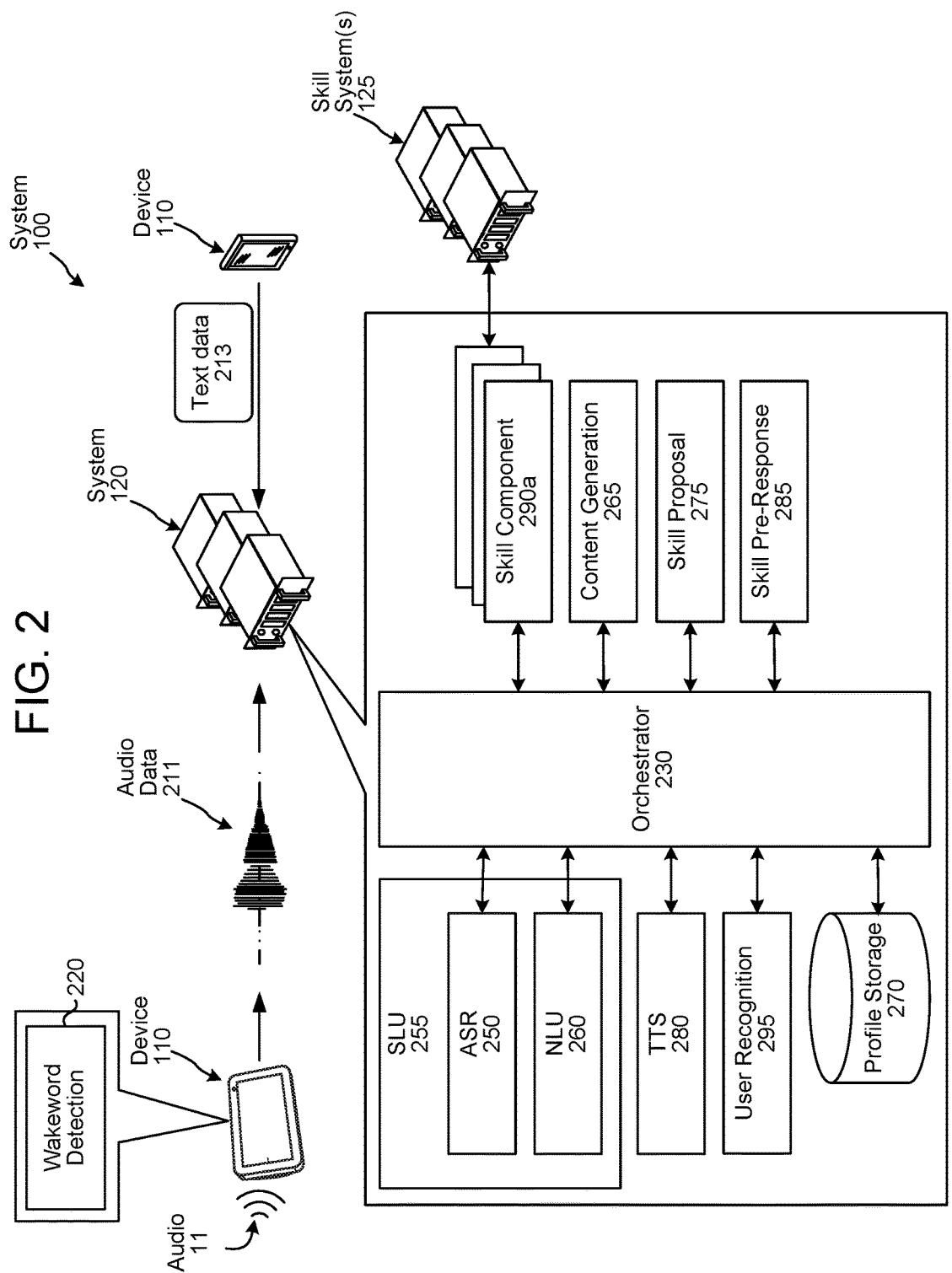
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language user input. The device 110 may determine text data 213 representing the typed natural language user input, and may send the text data 213 to the system 120, wherein the text data 213 is received by the orchestrator component 230.

Figure 3:
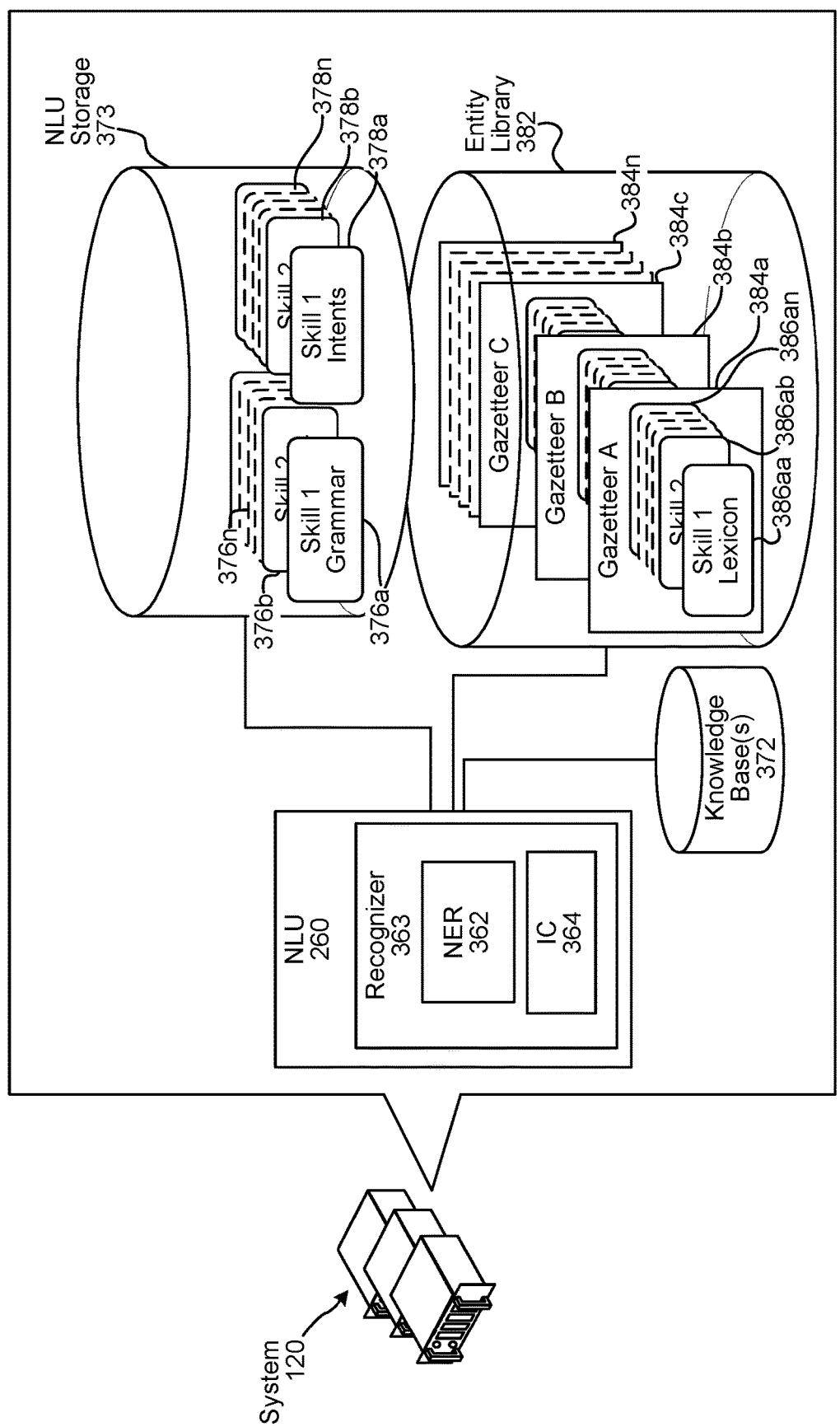
FIGS. 3-4 are conceptual diagrams illustrating how natural language understanding (NLU) processing may be performed, according to embodiments of the present disclosure.
Figure 4:
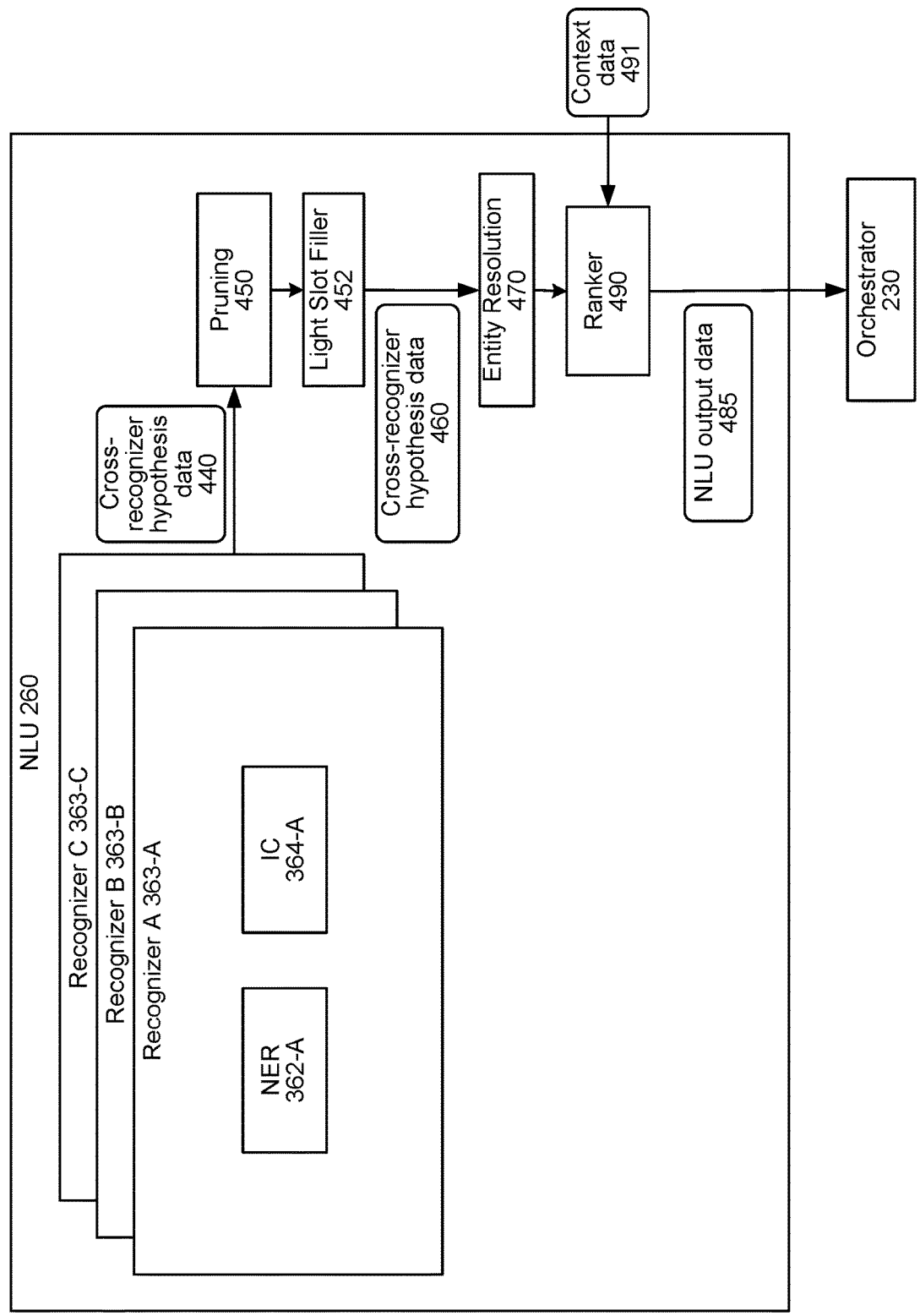

The orchestrator component 230 may send the text data 213 or ASR output data output, depending on the type of natural language user input received, to a NLU component 260. FIGS. 3-4 illustrate how the NLU component 260 may perform NLU processing. For reference, as used below, a "skill" may refer to a skill component 290, a skill system 125, or a combination of a skill component 290 and an associated skill system 125.

The NLU component 260 may include one or more recognizers 363. In at least some embodiments, a recognizer 363 may be associated with a skill (e.g., the recognizer may be configured to interpret a natural language user input to correspond to the skill). In at least some other embodiments, a recognizer 363 may be associated with a domain (e.g., the recognizer may be configured to interpret a natural language user input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first skill may process at least partially in parallel to a recognizer corresponding to a second skill. For further example, a recognizer corresponding to a first domain may process at least partially in parallel to a recognizer corresponding to a second domain. In another example, a recognizer corresponding to a skill may process at least partially in parallel to a recognizer corresponding to a domain.

The NLU component 260 may communicate with an NLU storage 373 including skill grammars (376a-376n), representing how natural language user inputs may be formulated to invoke skills, and skill intents (378a-378n) representing intents supported by respective skills. While not illustrated, the NLU storage 373 may also or alternatively include domain grammars, representing how natural language user inputs may be formulated to invoke domains, and domain intents representing intents supported by respective domains.

Each recognizer 363 may be associated with a particular grammar 376, one or more particular intents 378, and a particular personalized lexicon 386 (stored in an entity library 382). A gazetteer 384 may include skill-indexed (or domain-indexed) lexical information associated with a particular user. For example, Gazetteer A (384a) may include skill-indexed (or domain-indexed) lexical information 386aa to 386an. A user's music skill (or music domain) lexical information might include album titles, artist names, and song names, for example, whereas a user's contact list skill (or contact list domain) lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, or the like.

An NER component 362 applies grammar models 376 and lexical information 386 associated with one or more skills (or one or more domains) to determine a mention of one or more entities in text data/ASR output data input therein. In this manner, an NER component 362 identifies "slots" (i.e., particular words in text data/ASR output data) that may be needed for later processing. An NER component 362 may also label each slot with a slot/entity type (e.g., noun, place, city, artist name, song name, etc.).

Each grammar model 376 may include the names of entities (i.e., nouns) commonly found in natural language corresponding to a particular skill (or domain) to which the grammar model 376 relates, whereas lexical information 386 may be personalized to the user identifier output by a user recognition component for the natural language user input. For example, a grammar model 376 associated with a shopping skill (or domain) may include a database of words commonly used when people discuss shopping.

Each recognizer 363 may also include an intent classification (IC) component 364 that processes text data/ASR output data to determine an intent of a skill (or domain) that potentially corresponds to the natural language user input represented in the text data/ASR output data. An intent corresponds to an action to be performed that is responsive to the natural language user input. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data/ASR output data to the words and phrases in an intents database 378 associated with the skill (or domain) that is associated with the recognizer 363 implementing the IC component 364.

The intents identifiable by a specific IC component 364 may be linked to one or more skill-specific (or domain-specific) grammar frameworks 376 with "slots" to be filled. Each slot of a grammar framework XXB76 corresponds to a portion of text data/ASR output data that an NER component 362 believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model XXB76 for a <PlayMusic> intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill (or music domain) vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill}Music, {intent} Play Music, {artist name} rolling stones, {media type} SONG, and {song title}mother's little helper. For further example, a recognizer 363 may tag "play songs by the rolling stones" as: {domain} Music, {intent} Play Music, {artist name} rolling stones, and {media type}SONG.

As described above, more than one recognizer 363 may process with respect to text data/ASR output data representing a single natural language user input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, skill, etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones.
While the foregoing illustrates cross-recognizer hypothesis data 440 including two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may determine cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language user input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language user input "play songs by the stones," the entity resolution component 470 may reference a personal music catalog, user profile, or the like. The entity resolution component 470 may output NLU hypotheses, altered from the cross-recognizer hypothesis data 460, which include more detailed information (e.g., entity identifiers) about the specific entities mentioned in the slots and/or more detailed slot data that can eventually be used by a skill to perform an action responsive to the natural language user input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 may indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language user input is received).

The ranker component 490 may output NLU output data 485 including one or more NLU hypotheses. The NLU component 260 may send the NLU output data 485 to the orchestrator component 230.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 125 via one or more skill components 290. As used herein, a "skill" may refer to a skill component 290, a skill system 125, or a combination of a skill component 290 and a skill system 125. A skill may be configured to execute with respect to NLU output data. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user identifier/user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user identifiers/user profile identifiers, corresponding to one or more user profiles associated with the device profile. For example, a household device's profile may include the user identifiers of users of the household.

Figure 5:
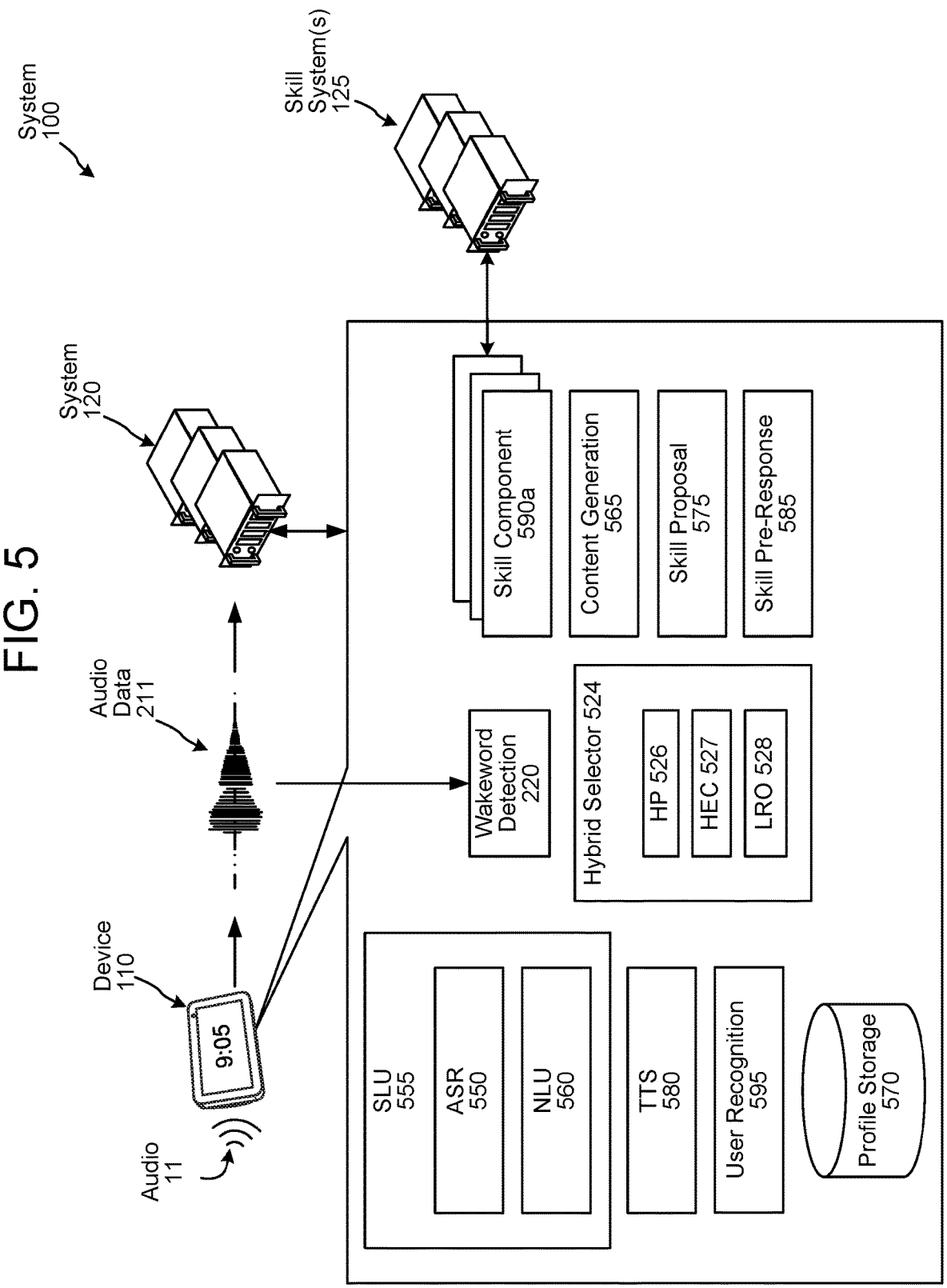
FIG. 5 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 5 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 524, of the device 110, may send the audio data 211 to the wakeword detection component 220. If the wakeword detection component 220 detects a wakeword in the audio data 211, the wakeword detection component 220 may send an indication of such detection to the hybrid selector 524. In response to receiving the indication, the hybrid selector 524 may send the audio data 211 to the system 120 and/or the ASR component 550. The wakeword detection component 220 may also send an indication, to the hybrid selector 524, representing a wakeword was not detected. In response to receiving such an indication, the hybrid selector 524 may refrain from sending the audio data 211 to the system 120, and may prevent the ASR component 550 from further processing the audio data 211. In this situation, the audio data 211 can be discarded.

The device 110 may conduct its own speech processing using on-device language processing components, such as an SLU component 555 (an ASR component 550 and an NLU 560), similar to the manner discussed above with respect to the SLU component 255 (or ASR component 250 and the NLU component 260) of the system 120. The device 110 may also internally include, or otherwise have access to, other components such as one or more skill components 590 capable of executing commands based on NLU output data or other results determined by the device 110/system 120, a user recognition component 595 (configured to process in a similar manner to that discussed above with respect to the user recognition component 295 of the system 120), profile storage 570 (configured to store similar profile data to that discussed above with respect to the profile storage 270 of the system 120), or other components. In at least some embodiments, the profile storage 570 may only store profile data for a user or group of users specifically associated with the device 110. Similar to as described above with respect to FIG. 2, a skill component 590 may communicate with a skill system(s) 125.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 524, of the device 110, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 211 to pass to the system 120 while also receiving (e.g., intercepting) this audio data 211 and sending the audio data 211 to the HEC 527.

In at least some embodiments, the hybrid selector 524 may further include a local request orchestrator (LRO) 528 configured to notify the ASR component 550 about the availability of new audio data 211 that represents user speech, and to otherwise initiate the operations of local language processing when new audio data 211 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 526 may allow the audio data 211 to pass through to the system 120 and the HP 526 may also input the audio data 211 to the on-device ASR component 550 by routing the audio data 211 through the HEC 527 of the hybrid selector 524, whereby the LRO 528 notifies the ASR component 550 of the audio data 211. At this point, the hybrid selector 524 may wait for response data from either or both of the system 120 or the local language processing components. However, the disclosure is not limited thereto, and in some examples the hybrid selector 524 may send the audio data 211 only to the local ASR component 550 without departing from the disclosure. For example, the device 110 may process the audio data 211 locally without sending the audio data 211 to the system 120.

The local ASR component 550 is configured to receive the audio data 211 from the hybrid selector 524, and to recognize speech in the audio data 211, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 590 that may work similarly to the skill component(s) 290 implemented by the system 120. The skill component(s) 590 may correspond to one or more domains that are used in order to determine how to act on a spoken input in a particular way, such as by outputting a directive that corresponds to the determined intent, and which can be processed to implement the desired operation. The skill component(s)

590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125.

The system 120 and/or the device 110 may include a content generation component 265 and 565, respectively. The content generation component 265/565 determines whether additional content/skill functionality, associated with but not included in a previous dialog session, should be output to the user 5/performed by a skill. The content generation component 265/565 may include various components configured to perform different processes for determining whether additional content/skill functionality should be output to the user 5/performed by a skill.

Figure 6:
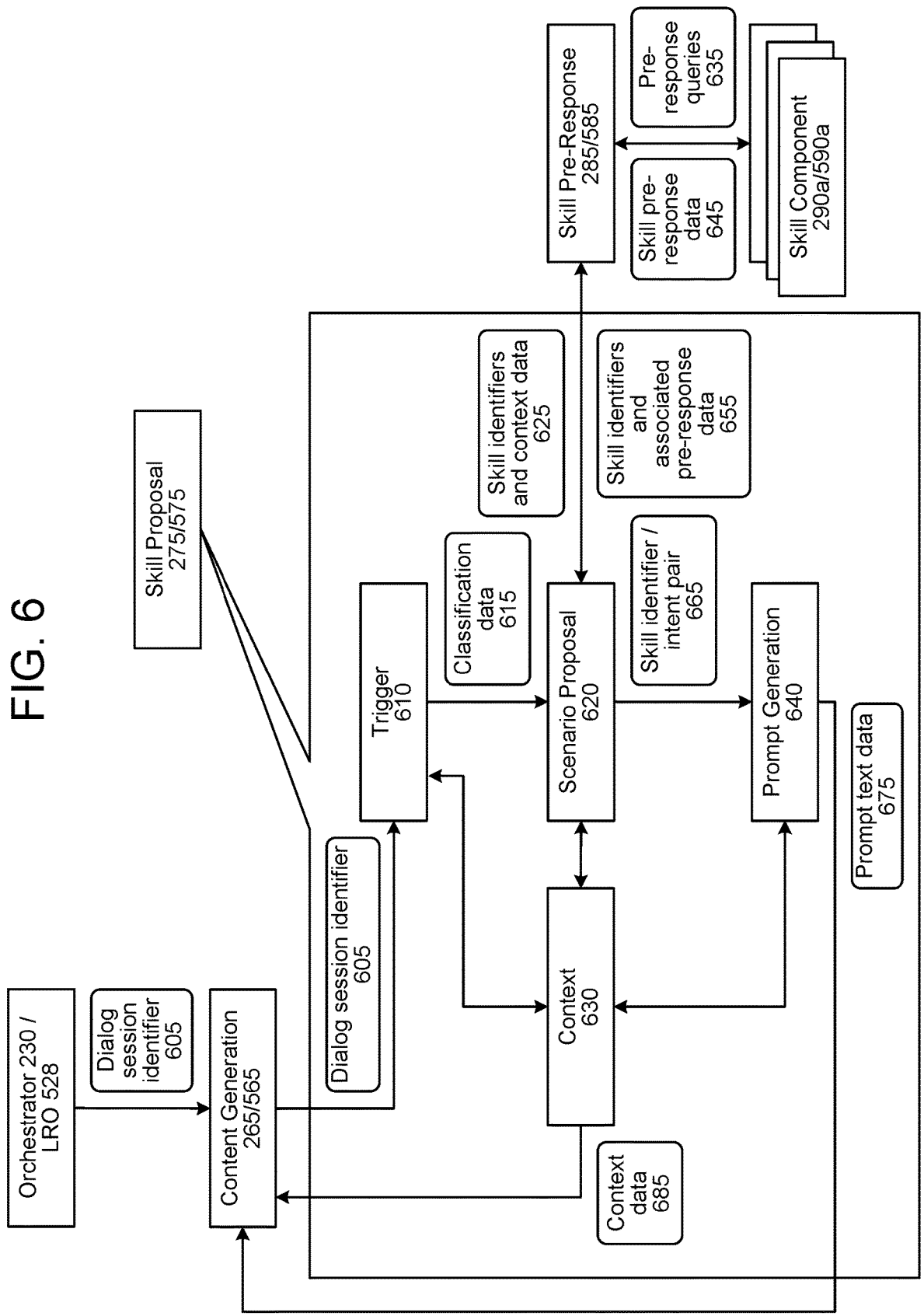
FIG. 6 is a conceptual diagram of components of a skill proposal component, according to embodiments of the present disclosure.

The system 120 and/or the device 110 may include a skill proposal component 275 and 575, respectively. The skill proposal component 275/575 is configured to determine if a skill, that may or may not have processed as part of a recently ended dialog session (i.e., a dialog session that ended within a past threshold amount of time, such as a past 5 minutes, a past half hour, a past hour, etc.), is to be recommended to the user 5. In at least some embodiments, the skill proposal component 275/575 may be implemented as part of the content generation component 265/565. In at least some other embodiments, the skill proposal component 275/575 may be implemented separate from but in communication with the content generation component 265/565. As illustrated in FIG. 6, after the system 120/device 110 determines a dialog session has ended, the orchestrator component 230/LRO 528 may send a dialog session identifier 605 (corresponding to the dialog session) to the content generation component 265/565. In response, the content generation component 265/565 may invoke the skill proposal component 275/575 (as a service of the content generation component 265/565) by sending the dialog session identifier 605 to the skill proposal component 275/575. Within the skill proposal component 275/575, the dialog session identifier may be sent to a trigger component 610.

Generally, the trigger component 610 may be a binary classifier configured to implement an ML model(s) 710 for determining whether additional skill functionality is to be recommended to the user 5 with respect to the recently ended dialog session. For example, in at least some embodiments it may be beneficial to implement the trigger component 610 as a single layer perceptron.

The ML model(s) 710 may be trained using positive examples of natural language user input pairs. Each natural language user input pair may include first and second natural language user inputs provided by a same user and corresponding to two different skills. In a natural language user input pair, the first natural language user input may be represented as first natural language text and the second natural language user input may be represented as second natural language text, the first natural language user input may be represented as a first intent and the second natural language user input may be represented as a second intent, the first natural language user input may be represented as a first NLU hypothesis and the second natural language user input may be represented as a second NLU hypothesis, etc. Thus, it will be appreciated that the representations of first and second natural language user inputs (in a natural language user input pair) are configurable, provided that the first and second natural language user inputs (of a single pair) are represented in a same data format.

The ML model(s) 710 may additionally or alternatively be trained using positive examples representing past dialog session data and corresponding recommended skill data in which the user accepted the recommendation. For example, a positive training example may include the intent(s), entity type(s), entity value(s), and or skill identifier corresponding to processing performed during a previous dialog session, as well as an intent and skill identifier of a corresponding recommendation that was accepted by the user that engaged in the corresponding dialog session. For further example, a positive training example may include a first intent determined during a previous dialog session, and a second intent that was recommended to and accepted by the user that engaged in the previous dialog session.

The ML model(s) 710 may additionally or alternatively be trained using negative example representing past instances of dialog session data and corresponding recommended skill data in which the user declined the recommendation. A user may be considered to have declined a recommendation if, for example, the user provided a natural language user input while the recommendation was being output to the user (e.g., which may be referred to as the user "barging in"), or the user (after the recommendation was output) either did not provide a further natural language user input or provided a further natural language user input (or provided some other type of user input, such as a gesture) that declined the recommendation. For example, a negative training example may include the intent(s), entity type(s), entity value(s), and or skill identifier corresponding to processing performed during a previous dialog session, as well as an intent and skill identifier of a corresponding recommendation that was declined by the user that engaged in the corresponding dialog session. For further example, a negative training example may include a first intent determined during a previous dialog session, and a second intent that was recommended to and declined by the user that engaged in the previous dialog session.

The ML model(s) 710 may additionally or alternatively be trained using user attributes. For example, a positive training example or a negative training example (including but not limited to the types of positive and negative training examples detailed above) may include one or more attributes of a user. Example user attributes include, but are not limited to, age, geographic location, gender, and education level.

The ML model(s) 710 may additionally or alternatively be trained using non-user specific dialog session attributes. For example, a positive training example or a negative training example (including but not limited to the types of positive and negative training examples detailed above) may include one or more non-user specific dialog session attributes. Example non-user specific dialog session attributes include, but are not limited to, a time of day when a dialog session was performed, a day of week when the dialog session was performed, and a length of time measured between when the dialog session began and when the dialog session ended.

In at least some embodiments, training examples may be manually annotated as being positive or negative training examples. In at least some other embodiments, one or more art-known/industry-known computer-implemented techniques may be used to annotate training examples as positive or negative training examples.

Various machine learning techniques may be used to train and operate the ML model(s) 710. The ML model(s) 710 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

At runtime, the ML model(s) 710 may input previous dialog session intent(s) data 705 representing one or more intents determined from NLU processing (or SLU processing) performed during the dialog session corresponding to the dialog session identifier 605. In at least some embodiments, the content generation component 265/565 may determine the previous dialog session intent(s) data 705 associated with the dialog session identifier 605, and send the previous dialog session intent(s) data 705 to the skill proposal component 275/575, where the previous dialog session intent(s) data 705 is input to the trigger component 610. In at least some other embodiments, the trigger component 610 may query a storage (storing various data corresponding to various dialog sessions) for the previous dialog session intent(s) data 705 associated with the dialog session identifier 605. In at least some embodiments, the previous dialog session intent(s) data 705 may only be an intent corresponding to a last natural language user input of the dialog session (corresponding to the dialog session identifier 605). In addition to the ML model(s) 710 inputting the previous dialog session intent(s) data 705 at runtime, the ML model(s) may input various other data at runtime, such as, for example, present time data 715 (e.g., representing a present time of day, a present day of the week, etc.) and/or user attribute data 725 representing one or more user attributes of the present user 5 (such as, an age of the user 5, a geographic location of the user 5, a gender of the user 5, an education level of the user 5, and/or any other user-specific information that may be stored in a user profile or group profile in the profile storage 270/570).

In at least some embodiments, the trigger component 610 may query a context component 630 for context data including the previous dialog session intent(s) data 705, the present time data 715, and/or the user attribute data 725. The context component 630 may communicate with a dialog session storage storing various dialog session data. For example, the context component 630 may query the dialog session storage for the previous dialog session intent(s) data 705. The context component 630 may also communicate with the profile storage 270/570. For example, the context component 630 may query the profile storage 270/570 for the user attribute data 725.

In general, the ML model(s) 710 may, given the intent(s) of the recently ended dialog session, a present time, one or more user attributes, and optionally other data, determine the intents that would likely correspond to the user 5's next natural language user input if the user 5 were to expand upon the recently ended dialog session. Thus, the ML model(s) 710 may output classification data 735 representing whether or not additional skill functionality is to be recommended to the user 5 with respect to the recently ended dialog session.

In at least some embodiments, the trigger component 610 may employ a self-learning policy engine using reinforcement learning or reward-based learning. In at least some embodiments, the self-learning policy engine may use deep reinforcement learning combining artificial neural networks with a reinforcement learning architecture. In at least some embodiments, the trigger component 610 may employ a self-learning policy using reinforcement learning or reward-based learning to determine intents. At a later time, the trigger component 610 may receive a reward signal indicating a reward (e.g., implicit or explicit positive user feedback data) or penalty (e.g., implicit or explicit negative user feedback data) associated with the determined intents, and the trigger component 610 may update the self-learning policy accordingly to facilitate determination of intents.

In at least some embodiments, the trigger component 610 may implement one or more rules (embodied as rule data 745) in addition to the ML model(s) 710. For example, the trigger component 610 may implement a rule that states whenever a natural language user input of a dialog session corresponds to an <OutputWeather> intent, the trigger component 610 is to output an <EventBooking> intent. In another example, the trigger component 610 may implement a rule to output a <BookTaxi> intent whenever a natural language user input of a dialog session corresponds to an <OutputWeather> intent and the device 110 (that captured the last natural language user input) is within 50 miles of the requested weather location. For further example, the trigger component 610 may implement a rule that states whenever a natural language user input of a dialog session corresponds to a <BookPlaneTicket> intent, the trigger component 610 is to output a <BookTaxi> intent. In at least some embodiments, a rule relate to a pair of intents that routinely correspond to natural language user inputs sequentially received from a single user of the system 100. In at least some other embodiments, the a rule may state whenever a last natural language user input of a dialog session corresponds to a first intent, the trigger component 610 is not to output a second intent.

The classification data 735 and the rule data 745 may be input to a decider component 720 of the trigger component 610. The decider component 720 determines classification data 615 based on the classification data 735 and the rule data 745. For example, if the rule data 745 indicates a first intent is to be output when a natural language input of a dialog session corresponds to a second intent, and a natural language input of the recently ended dialog session included a natural language input corresponding to the second intent, the decider component 720 may output classification data 615 representing skill functionality (generally, not any specific skill functionality) is to be recommended to the user 5, regardless of whether the classification data 735 generally indicates skill functionality (without being specific to any particular skill functionality) is to be recommended to the user 5.

Referring again to FIG. 6, the classification data 615 may be input to a scenario proposal component 620 of the skill proposal component 275/575. Whereas the trigger component 610 is generally configured to determine whether a skill to be recommended to the user 5 without making a determination as to what particular skill is to be recommended, the scenario proposal component 620 is generally configured to determine which skill to recommend to the user 5. The scenario proposal component 620 may implement an ML model(s) 810 (conceptually illustrated in FIG. 8). The ML model(s) 810 may be one or more of a neural network(s) (e.g., recursive neural network (RNN), convolutional neural network (CNN), deep neural network (DNN), etc.), a probabilistic graph(s), a statistical model(s), a regression model(s), a random forest(s), a classifier(s), or other type of ML model(s). The specific type of ML model(s) 810 implemented may be determined using experimental analysis.

The ML model(s) 810 may evaluate the validity of past dialog sessions of the user 5 given a current context (taking into consideration the recently ended dialog session). In other words, the ML model(s) 810 may determine which of the user 5's past dialog sessions most conforms to the current context and the recently ended dialog session. The ML model(s) 810 may be configured to rank, at runtime, various intents to determine a ranked list of intents. In the ranked list, each intent may be associated with a value (e.g., a confidence value). The ML model(s) 810 may assign a high value to an intent if the ML model(s) 810 determines the intent will provide a cohesive user experience in view of the recently ended dialog session, and that output data (determined based on the intent) will not be repetitive of output data output during the recently ended dialog session. Conversely, the ML model(s) 810 may assign a low value to an intent if the ML model(s) 810 determines the intent will not provide a cohesive user experience in view of the previous ended dialog session, and/or that output data (determined based on the intent) will be repetitive of output data output during the recently ended dialog session.

The ML model(s) 810 may be trained using positive examples of past multi-skill dialog sessions of various users of the system 120. A positive example, corresponding to a single past multi-skill dialog session, may include data such as, for example, intent data representing the intents determined during the past multi-skill dialog session, the skill identifiers of skills that processed during the past multi-skill dialog session, the output data output during the past multi-skill dialog session, and user attribute data (such as age, geographic location, gender, and education level).

In at least some embodiments, a human may annotate training examples for training the ML model(s) 810. In at least some other embodiments, one or more art-known/industry-known computer-implemented techniques may be used to annotate training examples for training the ML model(s) 810.

Various machine learning techniques may be used to train and operate the ML model(s) 810. The ML model(s) 810 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

At runtime, the ML model(s) 810 may input previous dialog session data 805. In at least some embodiments, the previous dialog session data 805 may represent all natural language user inputs and system outputs of the dialog session that recently ended. For example, the previous dialog session data 805 may include the intents, entity types, and/or entity values of all the natural language user inputs of the recently ended dialog session. For further example, the previous dialog session data 805 may represent the skills (include the skill identifiers) called to execute in response to the various natural language user inputs of the previous dialog session. In at least some embodiments, rather than representing all natural language user inputs of the previous dialog session, the previous dialog session data 805 may represent only the last natural language user input of the previous dialog session. For example, the previous dialog session data 805 may include the intent, entity type(s), and/or entity value(s) of the last natural language user input of the previous dialog session. For further example, the previous dialog session data 805 may represent the skill (include the skill identifier) called to execute in response to the last natural language user input of the previous dialog session. In at least some embodiments, the scenario proposal component 620 may query the context component 630 for the previous dialog session data 805. As such, the previous dialog session data 805 may be embodied as context data in at least some embodiments.

The ML model(s) 810 may also input, at runtime, present time data 815. The present time data 815 may represent a present time of day, a present day of the week, etc. In at least some embodiments, the scenario proposal component 620 may query the context component 630 for the present time data 815. As such, the present time data 815 may be embodied as context data in at least some embodiments.

The ML model(s) 810 may also input, at runtime, user attribute data 825 representing one or more user attributes of the present user 5. For example, the user attribute data 825 may represent an age of the user 5, a geographic location of the user 5, a gender of the user 5, an education level of the user 5, and/or any other user-specific information that may be stored in a user profile or group profile in the profile storage 270/570. In at least some embodiments, the scenario proposal component 620 may query the context component 630 for the user attribute data 825, and the context component 630 may query the profile storage 270/570 for the user attribute data 825. As such, the user attribute data 825 may be embodied as context data in at least some embodiments.

The ML model(s) 810 may also input, at runtime, multi-skill dialog session data 835 representing one or more previous multi-skill dialog sessions associated with a user identifier corresponding to the present user 5 (or associated with a device identifier corresponding to the present device 110 being interacted with by the user 5). For example, the multi-skill dialog session data 835 may include the intents, entity types, and/or entity values of the natural language user inputs of the previous multi-skill dialog session associated with the present user's user identifier and/or the present device's device identifier. For further example, the multi-skill dialog session data 835 may represent the skills (include the skill identifiers) called to execute in response to the various natural language user inputs of the previous multi-skill dialog session associated with the present user's user identifier and/or the present device's device identifier. In at least some embodiments, the scenario proposal component 620 may query the context component 630 for the multi-skill dialog session data 835, and the context component 630 may query a storage for the multi-skill dialog session data 835. As such, the multi-skill dialog session data 835 may be embodied as context data in at least some embodiments.

In general, the ML model(s) 810 evaluates whether a skill processing an intent will result in a cohesive user experience in view of the previously ended dialog session. The ML model(s) 810 may output ranked skill identifier/intent pair data 845 representing various skill identifier/intent pairs, with each skill identifier/intent pair being associated with a confidence (or other) score representing a likelihood that a skill (corresponding to the skill identifier of the skill identifier/intent pair) processing the intent will result in a cohesive user experience. In at least some embodiments, a skill (corresponding to a skill identifier in the ranked skill identifier/intent pair data 845) may have processed during the recently ended dialog session (corresponding to the dialog session identifier 605).

In at least some embodiments, the scenario proposal component 620 may employ a self-learning policy engine using reinforcement learning or reward-based learning. In at least some embodiments, the self-learning policy engine may use deep reinforcement learning combining artificial neural networks with a reinforcement learning architecture. In at least some embodiments, the scenario proposal component 620 may employ a self-learning policy using reinforcement learning or reward-based learning to rank intents. At a later time, the scenario proposal component 620 may receive a reward signal indicating a reward (e.g., implicit or explicit positive user feedback data) or penalty (e.g., implicit or explicit negative user feedback data) associated with the ranked intents, and the scenario proposal component 620 updates the self-learning policy accordingly to facilitate ranking of intents.

The scenario proposal component 620 may use skill pre-response data to refine (or filter) the ranked skill identifier/intents represented in the ranked skill identifier/intent pair data 845 output from the ML model(s) 810. The scenario proposal component 620 may have access to stored data representing an entity type(s) and an entity value(s) needed by a skill (of a skill identifier/intent pair in the ranked skill identifier intent pair data 845) to execute the associated intent of the pair. The scenario proposal component 620 may determine, for each skill identifier/intent pair, an entity value(s) that is represented in the previous dialog session data 805 as being associated with an entity type(s) that is associated with the intent. In at least some embodiments, the scenario proposal component 620 may query the context component 630 for the entity values associated with the intents in the previous dialog session data 805. For example, the scenario proposal component 620 may send the various skill identifier/intent pairs (determined by the ML model(s) 810) to the context component 630. In response to receiving the skill identifier/intent pairs, the context component 630 may query a storage (including the previous dialog session data 805) for entity values associated with entity types associated with the intents of the skill identifier/intent pairs. The entity types and corresponding entity values may be represented as context data in the data 625.

The scenario proposal component 620 sends the data 625 (including skill identifiers associated with respective intents, entity type(s), and entity value(s)) to a skill pre-response component 285/585 (implemented by the system 120 or the device 110). The skill pre-response component 285/585 is configured to query skills for pre-response data. Pre-response data may represent how a skill may process if called to respond to a natural language user input, and may optionally include a variety of other data representing a strength of the skill's response. For example, pre-response data may indicate a skill can personalize a response using profile data accessible to the skill (and may indicate the types of profile data accessible); pre-response data may indicate a skill can respond but cannot personalize the response; pre-response data may indicate a user does not have a subscription with the skill, but that the skill can respond using free functionality of the skill; etc.

The skill pre-response component 285/585 sends a pre-response query to each skill associated with a skill identifier output by the ML model(s) 810. While FIG. 6 illustrates the skill pre-response component 285/585 sending pre-response queries 635 to skill components 290/590, the skill pre-response component 285/585 may send the pre-response queries 635 to skill systems 125 without departing from the present disclosure. In at least some embodiments, the skill pre-response component 285/585 may send at least one pre-response query to at least one skill component 290/590 and at least one pre-response query to at least one skill system 125. The skill pre-response component 285/585 may determine a portion of the received data 625 associated with a particular skill identifier, and send, to a skill component and/or skill system corresponding to the skill identifier, a pre-response query including the portion of the received data 625. For example, the skill pre-response component 285/585 may send, to a skill component and/or skill system corresponding to a skill identifier, an intent, entity type(s), and entity value(s) associated with the skill identifier in the data 625.

A skill may determine, based on a received pre-request query and optionally other data available to the skill, whether the skill would be able to respond to a natural language user input corresponding to the intent, entity type(s), and entity value(s) in the received pre-response query. For example, a skill may determine pre-response data 645 indicating the skill can respond to such a natural language user input, indicating the skill may be able to respond to such a natural language user input (e.g., indicating the skill needs more data to determine whether the skill can respond to such a natural language user input), or indicating the skill cannot respond to such a natural language user input (e.g., due to the skill experiencing a high processing load).

In situations where a skill's pre-response data 645 indicates the skill can or may respond to the natural language user input, the pre-response data 645 may also include various other data representing a strength of the skill's potential response to the natural language user input. For example, such other data may indicate capabilities (e.g., output capabilities or components such as availability of a connected screen, loudspeaker, etc.) of a device that should be used to output the skill's response data 645 (in the situation where the skill pre-response data 645 includes output data determined based on the skill processing the pre-response query); pricing data corresponding to a product or service the natural language user input would request be purchased (or would request purchase data for); availability of a product the natural language user input would request be purchased; whether there are shipping fees for a product the natural language user input is requesting be purchased; whether the user 5 already has a profile and/or subscription with the skill; that the user 5 does not have a subscription with the skill, but that there is a free trial/tier the skill is offering; with respect to a taxi skill, a cost of a trip based on start and end locations, how long the user 5 would have to wait to be picked up, etc.; and/or other data available to the skill that is related to the skill's processing of the pre-response query. In at least some embodiments, a skill's pre-response data 645 may include a flag (or other indicator) representing a strength of the skill's ability to personalize its response to the user 5.

In at least some embodiments, a skill's pre-response data 645 may be configured to a pre-defined schema. By the system 120/device 110 requiring pre-response data to conform to a specific schema (e.g., by requiring skills to only be able to provide certain types of data in pre-response data), the system 120/device 110 may onboard new skills into the skill pre-response functionality described herein without needing to reconfigure the skill pre-response component 285/585 each time a new skill is onboarded.

The skill pre-response component 285/585 may output data 655 including skill identifiers and associated pre-responses. The data 655 may be input to the scenario proposal component 620. The scenario proposal component 620 may generate ranked skill identifier/intent pair data 855 based on the ranked skill identifier/intent pair data 845 and the data 655. For example, the scenario proposal component 620 may determine pre-response data representing a skill would be unable to process a natural language user input corresponding to an intent (associated with the skill in the ranked skill identifier/intent pair data 845), and may generate the ranked skill identifier/intent pair data 855 to correspond to the ranked skill identifier/intent pair data 845 but not including the removed skill identifier/intent pair. For further example, the scenario proposal component 620 may determine pre-response data representing a skill would be unable to process a natural language user input corresponding to an intent (associated with the skill in the ranked skill identifier/intent pair data 845), may thereafter determine an updated (lower) confidence score associated with the skill identifier/intent pair, and may generate the ranked skill identifier/intent pair data 855 to correspond to the ranked skill identifier/intent pair data 845 but including the skill identifier/intent pair with the updated (lower) confidence score.

The scenario proposal component 620 determines a skill identifier/intent pair associated with a highest ranking (e.g., a highest confidence or other score) in the ranked skill identifier/intent pair data 855. If the scenario proposal component 620 determines the highest ranked skill identifier/intent pair satisfies a condition (e.g., the confidence or other score of the highest ranked skill identifier/intent pair is equal to or greater than a threshold confidence or other score), the scenario proposal component 620 may output a skill identifier/intent pair 665 representing the highest ranked skill identifier/intent pair in the ranked skill identifier/intent pair data 855. In at least some embodiments, the skill identifier/intent pair 665 may be associated with one or more entity values capable of being processed by a skill to perform recommended skill functionality.

Rather than output a skill identifier/intent pair 665, in at least some embodiments the scenario proposal component 665 may output a linking protocol. For example, the linking protocol may correspond to a task to be performed, such as "book a ride from x to y at time z." As such, the linking protocol may be skill agnostic, and the resulting prompt (generated by the prompt generation component 640 as described herein below) may also be skill agnostic. In such embodiments, if the user accepts the recommended task, the system 120/110 could (at that point) engage the user in a set of system-generated outputs and corresponding user inputs to disambiguate which skill is to be used to perform the task.

If the scenario proposal component 620 determines the highest ranked skill identifier/intent pair fails to satisfy the condition (e.g., the confidence or other score of the highest ranked skill identifier/intent pair is less than the threshold confidence or other score), the scenario proposal component 620 may output an indicator representing a skill is not to be recommended. In response, the skill proposal may output the indicator to the content generation component 265/565, the content generation component 265/565 may output the indicator to the orchestrator component 230/LRO 528, and the system 100 may cease processing with respect to the dialog session identifier 605. As a result, the next time the user 5 provides a natural language user input to the system 120, the natural language user input may be associated with a new dialog session identifier.

In at least some embodiments, the content generation component 265/565 may communicate with one or more components (different from the skill proposal component 275/575) that perform processing to determine whether a skill and intent are to be recommend to the user 5. If the scenario proposal component 620 determines the highest ranked skill identifier/intent pair (in the ranked skill identifier/intent pair data 855) fails to satisfy the condition (e.g., the confidence or other score of the highest ranked skill identifier/intent pair is less than the threshold confidence or other score), rather than outputting the foregoing indicator, the scenario proposal component 620 may output a skill identifier/intent pair 665 determined by a component(s) other than the scenario proposal component 620. In at least some embodiments, the scenario proposal component 620 may choose to output the skill identifier/intent pair (determined by the other component(s)) rather than the indicator if the skill identifier/intent pair (output by the other component(s)) is associated with a confidence (or other score) satisfying the condition (e.g., the confidence or other score is equal to or greater than the threshold confidence or other score).

The skill identifier/intent pair 665 may be input into a prompt generation component 640 of the skill proposal component 275/575. The prompt generation component 640 is configured to determine prompt text data 675 recommending the skill and skill functionality corresponding to the skill identifier and intent in the skill identifier/intent pair 665. The prompt generation component 640 may be configured to inform the user 5 of what the skill is capable of performing in as succinct, natural language a way as possible. In at least some embodiments, the prompt generation component 640 may use template data to determine the output data 640. For example, the template data may include natural language text including a first variable/portion to be populated with text corresponding to a skill name, and a second variable/portion to be populated with natural language text corresponding to skill functionality performed when the skill executes the intent. For example, the template data may include text corresponding to "would you like to try [first variable: skill name], which can [second variable: functionality] for you?" The prompt generation component 640 may determine text corresponding to a skill name associated with the skill identifier represented in the skill identifier/intent pair 665, and natural language text corresponding to functionality performed when the skill (corresponding to the skill identifier) executes the intent represented in the skill identifier/intent pair 665. The prompt generation component 640 may thereafter determine prompt text data 675 corresponding to the template data wherein the first variable is populated with the skill name text and the second variable is populated with the natural language text corresponding to the functionality. In at least some other embodiments, the prompt generation component 640 may use one or more art-known/industry-known natural language generation techniques to determine the prompt text data 675 without using template data.

The context component 630 may determine context data 685 corresponding to the skill identifier/intent pair 665. For example, the context component 630 may determine previous dialog session data corresponding to the dialog session identifier 605, and determine an entity type(s) and/or an entity value(s) represented in the previous dialog session data and that would be useful for the skill (corresponding to the skill identifier in the skill identifier/intent pair 665, and corresponding to the skill name in the prompt text data 675) to execute the intent (represented in the skill identifier/intent pair 665 and the prompt text data 675). The entity type(s) and/or entity value(s) may correspond to any turn of the previous dialog session associated with the dialog session identifier 605. In other words, the context component 630 may not be limited to only determining an entity type(s) and/or entity value(s) associated with a last natural language user input of the previous dialog session. Moreover, the entity type(s) and/or entity value(s) may correspond to different skills in the previous dialog session. For example, the context data 685 may include a one entity value sent to one skill during the previous dialog session, and another entity value sent to another skill during the previous dialog session.

In at least some embodiments, the context component 630 may use a ML-based (e.g., neural network-based) technique(s) to determine the entity type(s) and/or entity value(s) represented in the context data 685. In at least some embodiments, the context component 630 may use a rule-based technique(s) to determine the entity type(s) and/or entity value(s) represented in the context data 685. For example, the context component 630 may have access to a storage storing data representing, for this skill identifier/intent pair, this is the entity type(s) the skill needs/wants to process. In at least some embodiments, the context component 630 may use a hybrid ML-based (e.g., neural network-based)/rule-based technique(s) to determine the entity type(s) and/or entity value(s) represented in the context data 685.

Figure 9A:
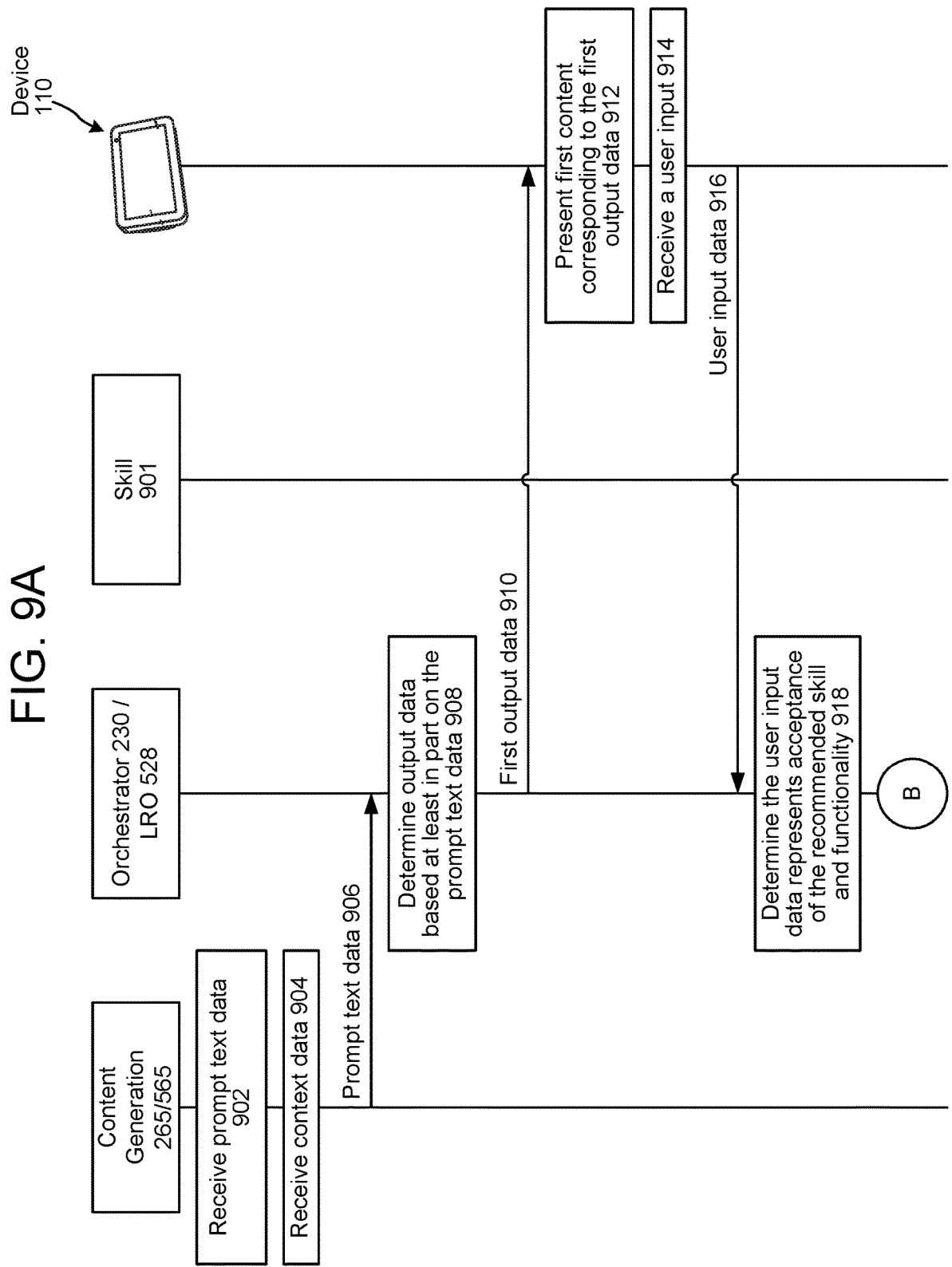

Referring to FIG. 9A, the content generation component 265/556 receives (902) the prompt text data output by the prompt generation component 640, and receives (904) the context data output by the context component 630. The content generation component 265/565 sends (906) the prompt text data to the orchestrator component 230/LRO 528.

The orchestrator component 230/LRO 528 determines (908) output data based at least in part on the prompt text data. For example, the orchestrator component 230/LRO 528 may determine the output data to include text data corresponding to the prompt text data. Additionally or alternatively, the orchestrator component 230/LRO 528 may send the prompt text data to the TTS component 280/580, the TTS component 280/580 may perform TTS processing on the prompt text data to determine audio data including synthesized speech corresponding to the prompt text data, the TTS component 280/580 may send the audio data to the orchestrator component 230/LRO 528, and the orchestrator component 230/LRO 528 may determine the output data to include the audio data. The orchestrator component 230/LRO 528 sends (910) the output data to the device 110.

The device 110 presents (912) content corresponding to the output data. For example, if the output data includes text data, the device 110 displays text corresponding to the text data. For further example, if the output data includes audio data corresponding to synthesized speech, the device 110 outputs audio corresponding to the synthesized speech. In another example, if the output data includes both text data and audio data (corresponding to synthesized speech), the device 110 displays text corresponding to the text data and/or outputs audio corresponding to the synthesized speech.

In at least some embodiments, the device 110 may be configured to communicate with (i.e., send data to and received data from) the system 120 via an application installed on the device 110 and associated with the system 120. In such situations, the device 110a may present the content via the application (e.g., as a pop-up notification, banner, or the like). Such an application may be referred to as a companion application. An example of such an application is the Amazon Alexa application that may be installed on a smart phone or tablet.

During or after displaying the text and/or outputting the audio, the device 110 may receive (914) a user input. For example, the user input may be a spoken natural language user input, a text-based natural language user input, a user-performed gesture, a user interaction with a button, or some other type of user input.

The device 110 sends (916), to the orchestrator component 230/LRO 528, user input data representing the user input. For example, if the user input is a spoken natural language user input, the user input data may be audio data corresponding to the spoken natural language user input. For further example, if the user input is a text-based natural language user input, the user input data may be text data corresponding to the text-based natural language user input. In another example, if the user input is a user-performed gesture, the user input data may be image data representing the user-performed gesture. For further example, if the user input is a user-performed gesture, the user input data may be text data indicating the user-performed gesture. According to another example, if the user input corresponds to a user interaction with a button, the user input data may be text data indicating the button interaction.

The orchestrator component 230/LRO 528 determines whether the user input data represents acceptance of the recommended skill and functionality. If the orchestrator component 230/LRO 528 determines the user input data represents declination of the recommend skill and functionality, the orchestrator component 230/LRO 528 may send an indication of such to the content generation component 265/565, and the content generation component 265/565 may delete the context data 685 from local storage. This results in processing, performed with respect to the previous dialog session, ending. Alternatively, if the orchestrator component 230/LRO 528 determines (918) the user input data represents acceptance of the recommend skill and functionality, the orchestrator component 230/LRO 528 sends (920), to the content generation component 265/565, acceptance data representing the user input accepted the recommended skill and functionality. In response to receiving the acceptance data, the content generation component 265/565 sends (922) the context data 685 to the recommended skill 901 (i.e., corresponding to the skill identifier represented in the skill identifier/intent pair data 765, and corresponding to the skill name represented in the prompt text data 675).

The skill 901 determines (924) output data based at least in part on the context data 685. That is, the skill 901 determines the output data based at least in part on the intent and entity value(s) represented in the context data 685. As mentioned herein above, since the context data 685 includes the intent and entity value(s) from the previous dialog session, the skill 901 may begin processing at a location in its processing pipeline after a portion of the processing pipeline corresponding to welcome prompts to gather information from the user 5. Such minimizes the likelihood that the skill 901 will query the user 5 for information the user 5 provided during the previous dialog session. The skill 901 sends (926) the output data to the orchestrator component 230/LRO 528, the orchestrator component 230/LRO 528 sends (928) the output data to the device 110, and the device 110 presents (930) content corresponding to the output data. In at least some embodiments, based on determining the user input data represents acceptance of the recommended skill and functionality, the system may associate the output data with the dialog session identifier 605. As a result, the dialog session, which was previously determined to have ended, may be considered ongoing again.

Figure 10:
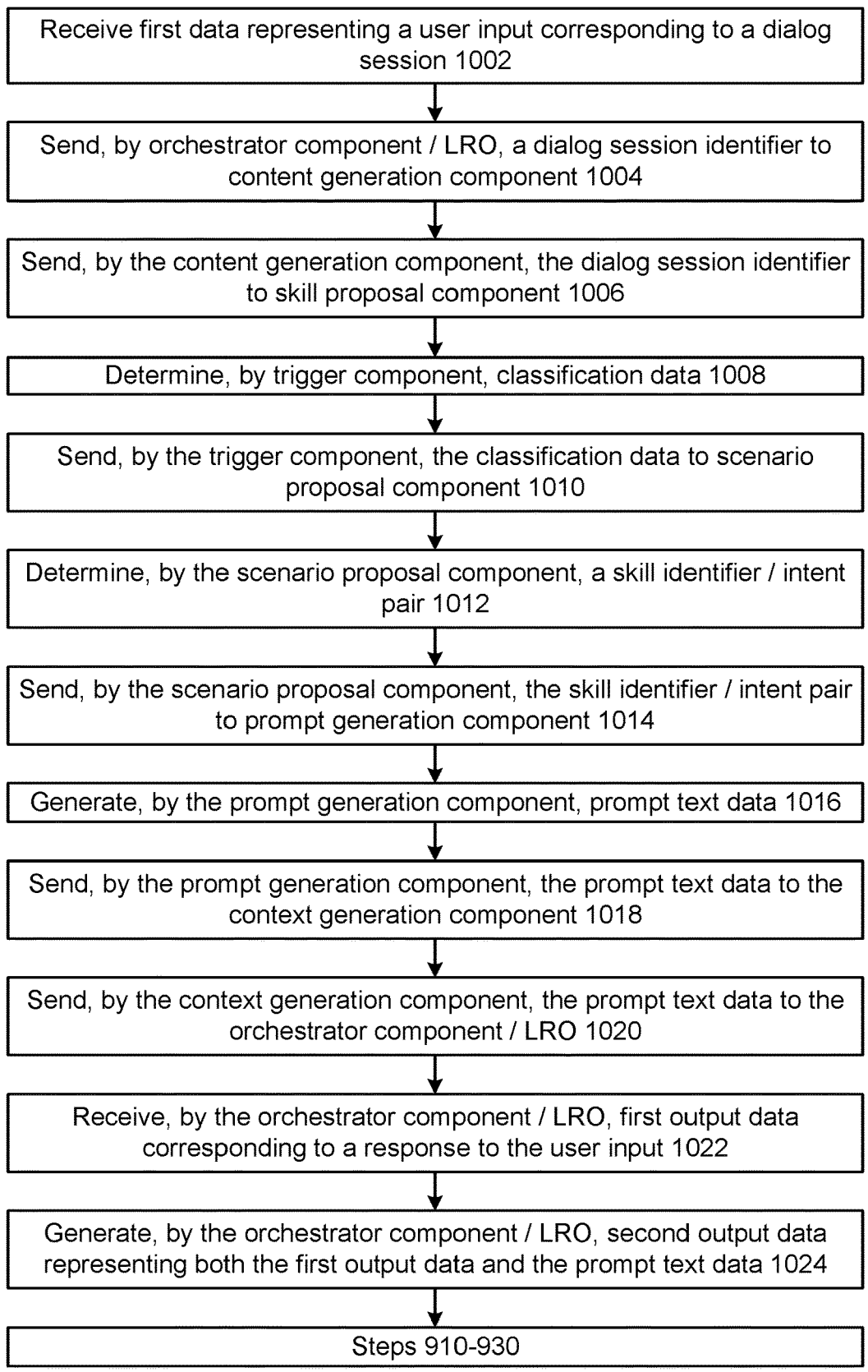
FIG. 10 is a process flow diagram illustrating how the skill proposal component may be implemented during a dialog session, according to embodiments of the present disclosure.

In at least some embodiments, the skill proposal component 275/575 may process during a dialog session, as opposed to after a dialog session as described herein above. Moreover, in at least some embodiments, the skill proposal component 275/575 recommended skill and functionality may be included in an output generated by a skill in response to a user input of the dialog session. Referring to FIG. 10, the system 120/device 110 receives (1002) a using input corresponding to a dialog session. The user input may be a first user input of the dialog session, or a subsequent user input of the dialog session.

Sometime after the system 120/device 110 receives the user input, the orchestrator component 230/LRO 528 sends (1004) a dialog session identifier (of the ongoing dialog session) to the content generation component 265/565. In response, the content generation component 265/565 sends (1006) the dialog session identifier to the skill proposal component 275/575.

Figure 7:
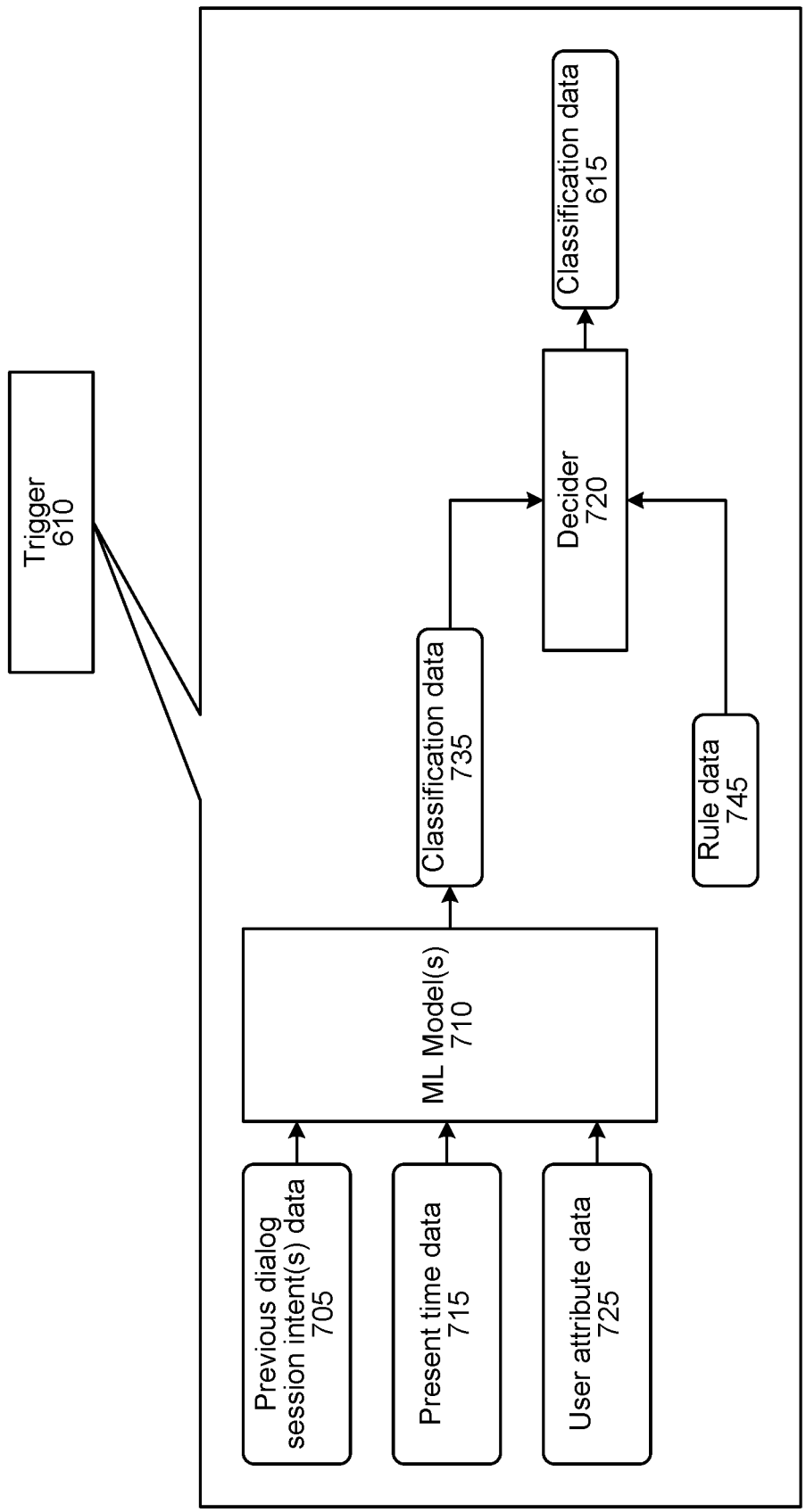
FIG. 7 is a conceptual diagram of components of a trigger component, according to embodiments of the present disclosure.

Within the skill proposal component 275/575, the dialog session identifier is sent to the trigger component 610. The trigger component 610 processes, as described herein above with respect to FIG. 7, to determine (1008) classification data. In the example of FIG. 10, the ML model(s) 710 may process dialog session intent(s) data representing one or more previous intents of the ongoing dialog session. The trigger component 610 sends (1010) the classification data to the scenario proposal component 620.

Figure 8:
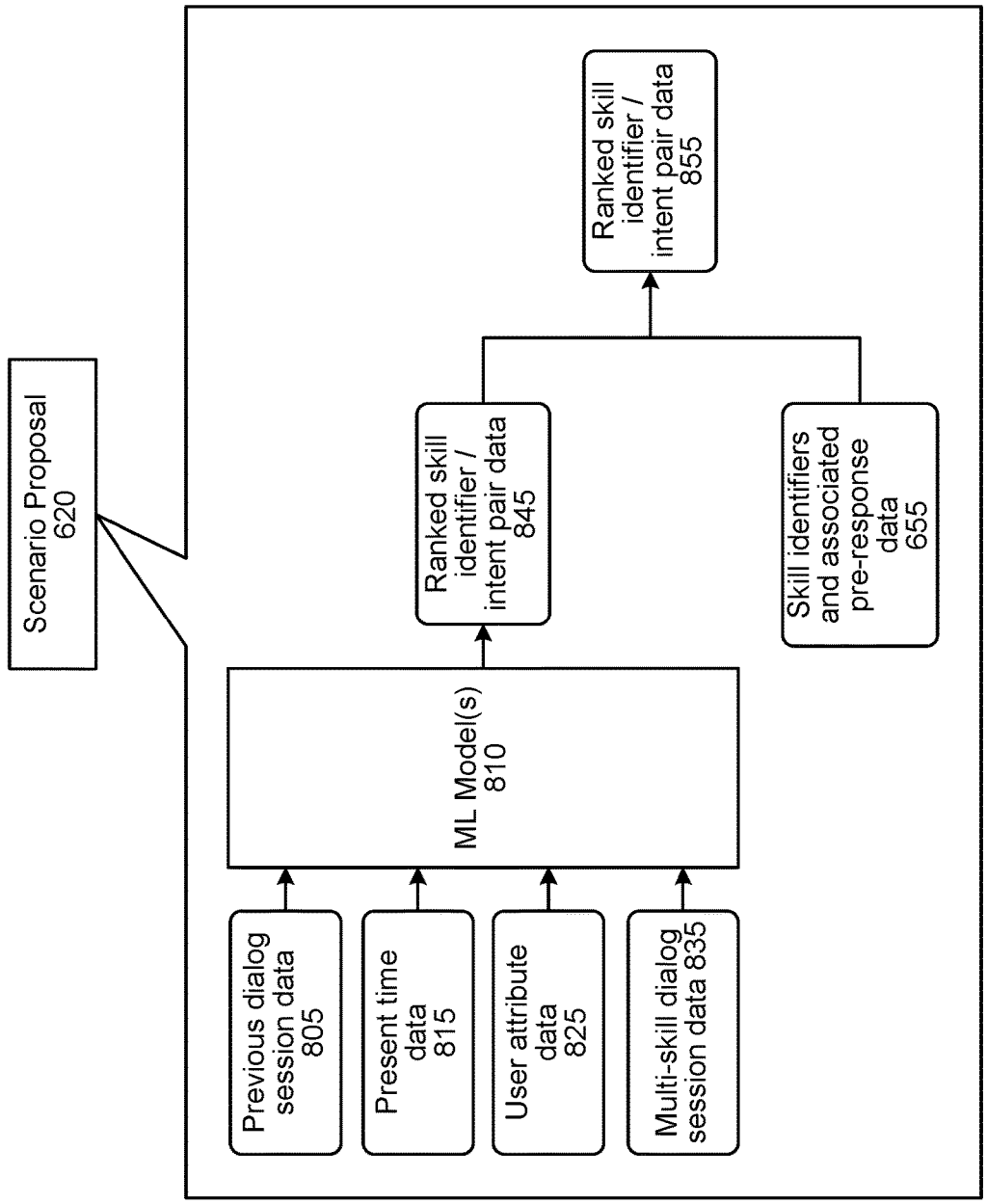
FIG. 8 is a conceptual diagram of components of a scenario proposal component, according to embodiments of the present disclosure.

The scenario proposal component 620 processes, as described herein above with respect to FIG. 8, to determine (1012) a skill identifier/intent pair to be recommended to the user 5 engaging in the dialog session. In the example of FIG. 10, the ML model(s) 810 may process dialog session data representing corresponding to the ongoing dialog session, as opposed to the previous dialog session data 805 described herein. The scenario proposal component 620 sends (1014) the skill identifier/intent pair to the prompt generation component 640.

The prompt generation component processes, as described herein above with respect to FIG. 6, to generate (1016) prompt text data. The prompt generation component 640 sends (1018) the prompt text data to the content generation component 265/565, which may send (1020) the prompt text data to the orchestrator component 230/LRO 528.

Prior to or after receiving the prompt text data, the orchestrator component 230/LRO 528 may receive (1022) (e.g., from a skill) first output data corresponding to a response to the user input received at step 1002. The orchestrator component 230/LRO may generate (1024) second output data representing both the first output data and the prompt text data. For example, the orchestrator component 230/LRO 528 may determine the second output data to include first text data representing the first output data and second text data representing the prompt text data. In at least some embodiments, the orchestrator component 230/LRO 528 may send the first and second text data to the TTS component 280/580, the TTS component 280/580 may perform TTS processing on the first and second text data to determine audio data including synthesized speech corresponding to the first and second text data, the TTS component 280/580 may send the audio data to the orchestrator component 230/LRO 528, and the orchestrator component 230/LRO 528 may determine the second output data to include the audio data. Thereafter, the system 120/device 110 may perform steps 910-930 described above with respect to FIGS. 9A-9B.

Figure 11:
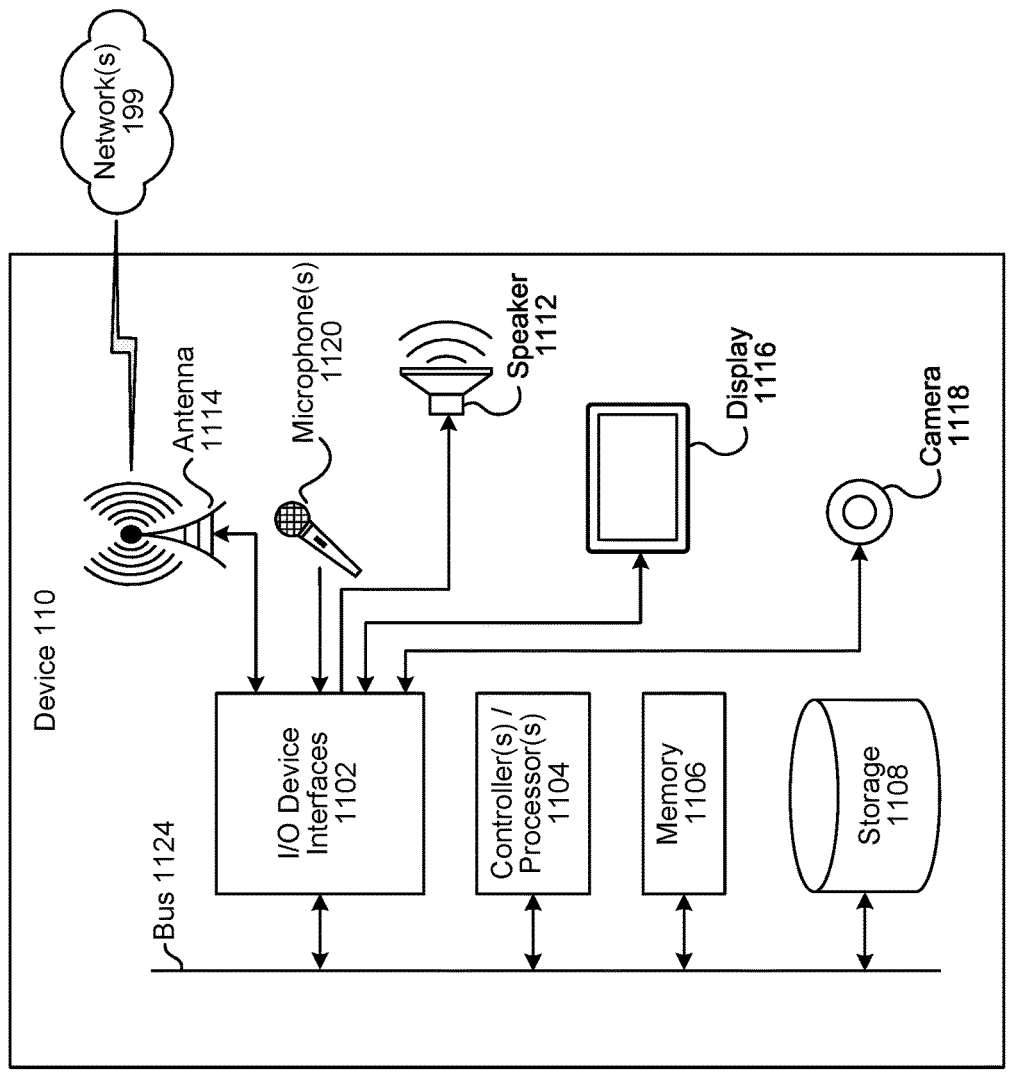
FIG. 11 is a block diagram conceptually illustrating example components of a device, according to embodiments of the present disclosure.
Figure 12:
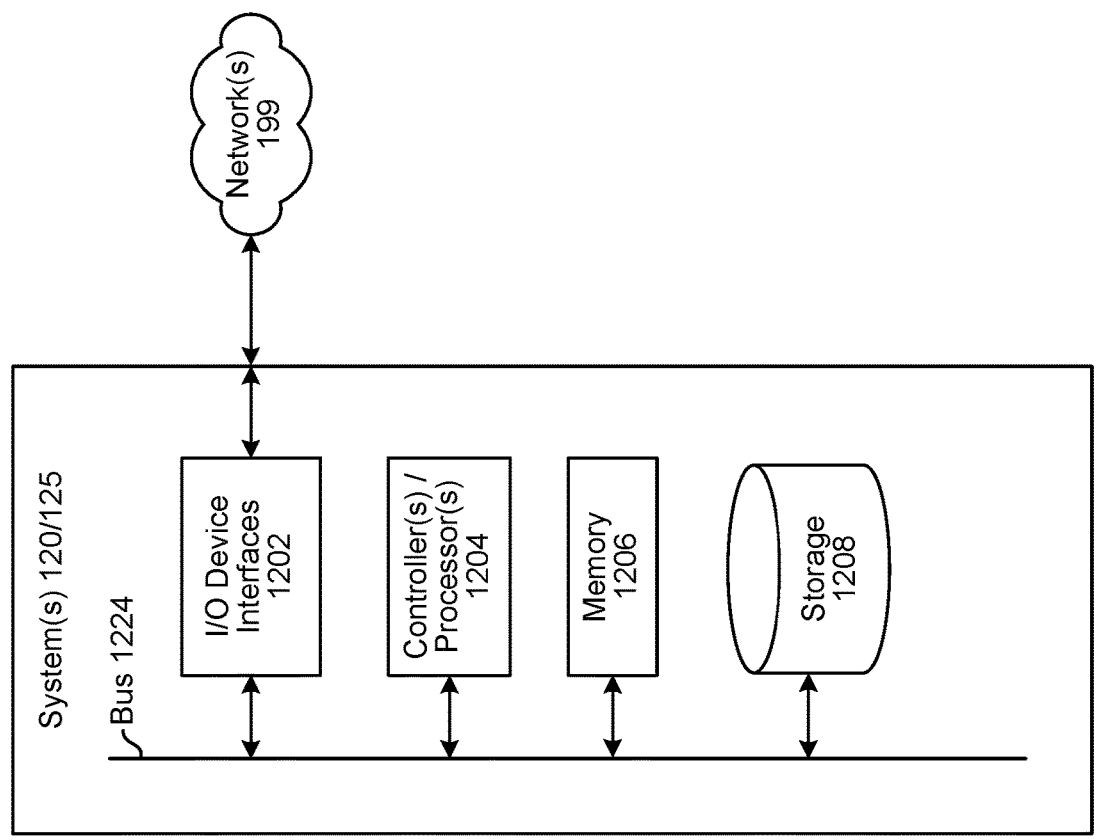
FIG. 12 is a block diagram conceptually illustrating example components of a system, according to embodiments of the present disclosure.

FIG. 11 is a block diagram conceptually illustrating example components of a device 110 according to the present disclosure. FIG. 12 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1102/1202), processor(s) (1104/1204), memory (1106/1206), and/or storage (1108/1208) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 13:
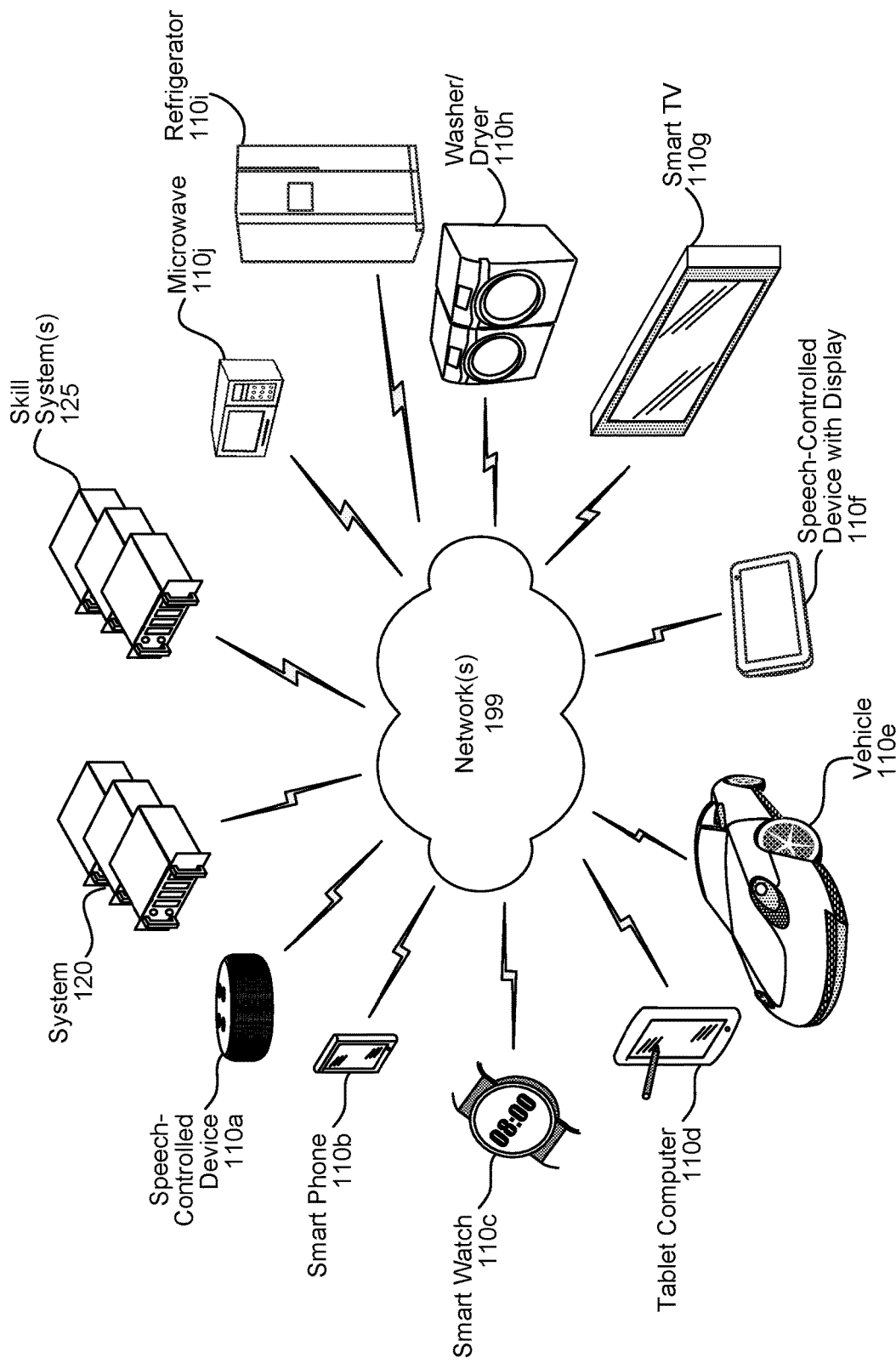
FIG. 13 illustrates an example of a computer network for use with the overall system, according to embodiments of the present disclosure.

As illustrated in FIG. 13, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device, first audio data representing a first spoken natural language user input;
    processing the first audio data to determine first natural language understanding (NLU) output data representing the first spoken natural language user input;
    sending the first NLU output data to a first processing component;
    receiving, from the first processing component, first output data responsive to the first spoken natural language user input;
    determining, using at least a first machine learning (ML) trained model, a first indicator representing system functionality is to be indicated to a user;
    based at least in part on the first indicator, processing, using at least a second ML trained model, at least one of dialog session data, time data, user attribute data, and previous dialog session data to determine a second processing component and a first intent are to be indicated to the user;
    determining second output data:
        including the first output data, and
        indicating the second processing component and the first intent;
    sending the second output data to the first device for output;
    receiving, from the first device, second audio data representing a second spoken natural language user input;
    processing the second audio data to determine the second spoken natural language user input represents the second processing component is to process with respect to the first intent;
    determining context data including a first entity value associated with the first intent;
    sending, to the second processing component, first data representing the first intent and the first entity value;
    receiving, from the second processing component, third output data corresponding to the first intent and the first entity value; and
    sending the third output data to the first device for output.

2. The computer-implemented method of claim 1, wherein receiving the first output data comprises receiving first natural language text data responsive to the first spoken natural language user input, and wherein the computer-implemented method further comprises:
    determining second natural language text data representing the second processing component and the first intent; and
    performing text-to-speech (TTS) processing to generate the second output data to comprise synthesized speech corresponding to the first natural language text data and the second natural language text data.

3. The computer-implemented method of claim 1, further comprising:
receiving, from the first device, third audio data representing a third spoken natural language user input;
processing the third audio data to determine second NLU output data representing the third spoken natural language user input;
sending the second NLU output data to the first processing component;
receiving, from the first processing component, fourth output data responsive to the third spoken natural language user input;
sending the fourth output data to the first device for output;
using the at least first ML trained model to determine a second indicator representing system functionality is to be recommended;
using the at least second ML trained model to determine:
a first confidence value representing a third processing component and a second intent are to be indicated to the user, and
a second confidence value representing a fourth processing component and a third intent are to be indicated to the user;
determining the first confidence value fails to satisfy a condition;
determining the second confidence value fails to satisfy the condition; and
in response to both the first confidence value and the second confidence value both failing to satisfy the condition, ceasing processing with respect to determining a prompt to indicate a further processing component is to process with respect to a further intent.

4. The computer-implemented method of claim 1, wherein the first natural language user input is associated with a dialog session identifier, and wherein:
the dialog session data represents:
at least one previous spoken natural language user input associated with the dialog session identifier, and
at least one previous system response corresponding to the at least one previous spoken natural language user input and associated with the dialog session identifier;
the time data represents a present time of day;
the user attribute data is associated with the first spoken natural language user input; and
the previous dialog session data represents one or more previous dialog sessions associated with a user profile identifier associated with the first spoken natural language user input.

5. A computer-implemented method comprising:
receiving first data representing a first natural language user input;
processing the first data to determine first natural language understanding (NLU) output data representing the first natural language user input;
sending the first NLU output data to a first processing component;
receiving, from the first processing component, first output data responsive to the first natural language user input;
determining, using at least a first machine learning (ML) trained model, a first indicator representing system functionality is to be indicated to a user;
based at least in part on the first indicator, processing, using at least a second ML trained model, at least one of dialog session data, time data, user attribute data, and previous dialog session data to determine a second processing component and a first intent are to be indicated to the user;
determining second output data:
including the first output data, and
indicating the second processing component and the first intent; and
sending the second output data to a first device for output.

6. The computer-implemented method of claim 5, further comprising:
receiving, from the first device, second data representing a second natural language user input;
processing the second data to determine the second natural language user input represents the second processing component is to process with respect to the first intent;
determining context data corresponding to processing of the first natural language user input and a third natural language user input;
determining, in the context data, a first entity value corresponding to a first entity type associated with the first intent;
sending, to the second processing component, the first intent and the first entity value;
receiving, from the second processing component, third output data corresponding to the first intent and the first entity value; and
sending the third output data to the first device for output.

7. The computer-implemented method of claim 5, wherein determining the second output data further comprises:
determining template data corresponding to a natural language output including:
a first portion corresponding to a processing component name, and
a second portion corresponding to an intent;
determining a first processing component name corresponding to the second processing component;
determining second data corresponding to the template data wherein:
the first portion is populated with the first processing component name, and
the second portion is populated with the first intent; and
performing text-to-speech (TTS) processing on the second data and the first output data to determine the second output data, the second output data including synthesized speech corresponding to the second data and the first output data.

8. The computer-implemented method of claim 5, further comprising:
determining first rule data representing the first intent is to be indicated when a most recent natural language user input of a dialog session corresponds to a third intent;
determining the first NLU output data includes the third intent; and
determining the first intent is to be indicated based at least in part on the first NLU output data including the third intent and the first rule data.

9. The computer-implemented method of claim 5, further comprising:
receiving second data representing a second natural language user input;
processing the second data to determine second NLU output data representing the second natural language user input;
sending the second NLU output data to the first processing component;

receiving, from the first processing component, third output data responsive to the second natural language user input;

sending the third output data to the first device for output;

using the at least second ML trained model to determine:
- a first value representing a third processing component and a second intent are to be indicated, and
- a second value representing a fourth processing component and a third intent are to be indicated;

determining the first value fails to satisfy a condition;

determining the second value fails to satisfy the condition; and based at least in part on the first value and the second value both failing to satisfy the condition, ceasing processing with respect to determining a prompt to indicate a further processing component is to process with respect to a further intent.

10. The computer-implemented method of claim 5, further comprising:
determining the first output data is associated with a first dialog session identifier, the first dialog session identifier corresponding to processing performed with respect to the first natural language user input and a second natural language user input;
determining an end of a first dialog session corresponding to the first dialog session identifier; and
using the at least first ML trained model based at least in part on determining the end of the first dialog session.

11. The computer-implemented method of claim 5, further comprising:
determining processing data associated with a first dialog session identifier, the processing data comprising:
first processing data corresponding to processing performed with respect to the first natural language user input, and
second processing data corresponding to processing performed with respect to a second natural language user input; and
further processing, using the at least second ML trained model, the first processing data and the second processing data.

12. The computer-implemented method of claim 5, wherein the first natural language user input is associated with a dialog session identifier, and wherein:
the dialog session data represents:
at least one previous spoken natural language user input associated with the dialog session identifier, and
at least one previous system response corresponding to the at least one previous spoken natural language user input and associated with the dialog session identifier;
the time data represents a present time of day;
the user attribute data is associated with the first natural language user input; and
the previous dialog session data represents one or more previous dialog sessions associated with a user profile identifier associated with the first natural language user input.

13. A computing system, comprising:
at least one processor; and
at least one memory comprising instructions that, when executed by the at least one processor, cause the computing system to:
receive first data representing a first natural language user input;
process the first data to determine first natural language understanding (NLU) output data representing the first natural language user input;
send the first NLU output data to a first processing component;
receive, from the first processing component, first output data responsive to the first natural language user input;
determine, using at least a first machine learning (ML) trained model, a first indicator representing system functionality is to be indicated to a user;
based at least in part on the first indicator, process, using at least a second ML, trained model, at least one of dialog session data, time data, user attribute data, and previous dialog session data to determine a second processing component and a first intent are to be indicated to the user;
determine second output data:
including the first output data, and
indicating the second processing component and the first intent; and
send the second output data to a first device for output.

14. The computing system of claim 13, wherein the at least one memory further comprises instructions that, when executed by the at least one processor, further cause the computing system to:
receive, from the first device, second data representing a second natural language user input;
process the second data to determine the second natural language user input represents the second processing component is to process with respect to the first intent;
determine context data corresponding to processing of the first natural language user input and a third natural language user input;
determine, in the context data, a first entity value corresponding to a first entity type associated with the first intent;
send, to the second processing component, the first intent and the first entity value;
receive, from the second processing component, third output data corresponding to the first intent and the first entity value; and
send the third output data to the first device for output.

15. The computing system of claim 13, wherein the at least one memory further comprises instructions that, when executed by the at least one processor, further cause the computing system to:
determine template data corresponding to a natural language output including:
a first portion corresponding to a processing component name, and
a second portion corresponding to an intent;
determine a first processing component name corresponding to the second processing component;
determine second data corresponding to the template data wherein:
the first portion is populated with the first processing component name, and
the second portion is populated with the first intent; and
perform text-to-speech (TTS) processing on the second data and the first output data to determine the second output data, the second output data including synthesized speech corresponding to the second data and the first output data.

16. The computing system of claim 13, wherein the at least one memory further comprises instructions that, when executed by the at least one processor, further cause the computing system to:
- determine first rule data representing the first intent is to be indicated when a most recent natural language user input of a dialog session corresponds to a third intent;
- determine the first NLU output data includes the third intent; and
- determine the first intent is to be indicated based at least in part on the first NLU output data including the third intent and the first rule data.

17. The computing system of claim 13, wherein the at least one memory further comprises instructions that, when executed by the at least one processor, further cause the computing system to:
- receive second data representing a second natural language user input;
- process the second data to determine second NLU output data representing the second natural language user input;
- send the second NLU output data to the first processing component;
- receive, from the first processing component, third output data responsive to the second natural language user input;
- send the third output data to the first device for output;
- use the at least second ML trained model to determine:
  - a first value representing a third processing component and a second intent are to be indicated, and
  - a second value representing a fourth processing component and fourth third intent are to be indicated;
- determine the first value fails to satisfy a condition;
- determine the second value fails to satisfy the condition; and
- based at least in part on the first value and the second value both failing to satisfy the condition, cease processing with respect to determining a prompt to indicate a further processing component is to process with respect to a further intent.

18. The computing system of claim 13, wherein the at least one memory further comprises instructions that, when executed by the at least one processor, further cause the computing system to:
- determine the first output data is associated with a first dialog session identifier, the first dialog session identifier corresponding to processing performed with respect to the first natural language user input and a second natural language user input;
- determine an end of a first dialog session corresponding to the first dialog session identifier; and
- use the at least first ML trained model based at least in part on determining the end of the first dialog session.

19. The computing system of claim 13, wherein the at least one memory further comprises instructions that, when executed by the at least one processor, further cause the computing system to:
- determine processing data associated with a first dialog session identifier, the processing data comprising:
  - first processing data corresponding to processing performed with respect to the first natural language user input, and
  - second processing data corresponding to processing performed with respect to a second natural language user input; and
- further process, using the at least second ML trained model, the first processing data and the second processing data.

20. The computing system of claim 13, wherein the first natural language user input is associated with a dialog session identifier, and wherein
the dialog session data represents:
- at least one previous spoken natural language user input associated with the dialog session identifier, and
- at least one previous system response corresponding to the at least one previous spoken natural language user input and associated with the dialog session identifier;

the time data represents a present time of day;
the user attribute data is associated with the first natural language user input; and
the previous dialog session data represents one or more previous dialog sessions associated with a user profile identifier associated with the first natural language user input.

* * * * *